United States Patent
Kobayashi et al.

(10) Patent No.: US 8,649,360 B2
(45) Date of Patent: Feb. 11, 2014

(54) WIRELESS BASE STATION AND SIGNAL PROCESSING METHOD

(75) Inventors: Shinichiro Kobayashi, Kawasaki (JP); Hideo Kato, Kawasaki (JP); Yoshihisa Nakayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 13/094,422

(22) Filed: Apr. 26, 2011

(65) Prior Publication Data

US 2012/0099570 A1    Apr. 26, 2012

Related U.S. Application Data

(63) Continuation of application No. PCT/JP2008/070214, filed on Nov. 6, 2008.

(51) Int. Cl.
*H04W 4/00* (2009.01)

(52) U.S. Cl.
USPC .......................................................... 370/338

(58) Field of Classification Search
USPC ......... 370/338, 335, 328, 343, 445, 437, 465; 455/450, 447, 509, 519, 448, 426.1, 455/452.1
See application file for complete search history.

(56) References Cited

U.S. PATENT DOCUMENTS

| | | | |
|---|---|---|---|
| 6,201,970 B1 * | 3/2001 | Suzuki et al. | 455/450 |
| 7,430,195 B2 * | 9/2008 | Utsunomiya et al. | 370/338 |
| 2009/0213802 A1 | 8/2009 | Miki et al. | |

FOREIGN PATENT DOCUMENTS

| | | |
|---|---|---|
| EP | 2034759 | 3/2009 |
| JP | 2003-224538 | 8/2003 |
| JP | 2004-187184 | 7/2004 |
| JP | 2004-248005 | 9/2004 |
| JP | 2007-189360 | 7/2007 |
| JP | 2007-221289 | 8/2007 |
| JP | 2007-228547 | 9/2007 |
| JP | 2007-336496 | 12/2007 |
| JP | 2008-042249 | 2/2008 |
| JP | 2008-078790 | 4/2008 |
| JP | 2008-131558 | 6/2008 |
| WO | 2007/148610 | 12/2007 |

OTHER PUBLICATIONS

International Search Report for corresponding International Patent Application No. PCT/JP2008/070214, mailed Feb. 10, 2009.
3GPP TS 36.211 V8.3.0. (May 2008); 3rd Generation Partnership Project; Technical Specification Group Radio Access Network; Evolved Universal Terrestrial Radio Access (E-UTRA); Physical Channels and Modulation (Release 8); May 2008.

(Continued)

*Primary Examiner* — Chi Pham
*Assistant Examiner* — Alexander O Boakye
(74) *Attorney, Agent, or Firm* — Myers Wolin, LLC

(57) ABSTRACT

A total of n signal processing circuits respectively constituted by independent circuit blocks process signals at the Data Link and Physical Layers. The signal processing circuits are associated with respective n groups of M/n subcarriers each, to process signals at the Data Link and Physical Layers. For example, the signal processing circuit independently processes signals of the subcarrier group at the Data Link and Physical Layers, the signal processing circuit independently processes signals of the subcarrier group at the Data Link and Physical Layers, and so on. The signal processing circuit independently processes signals of the subcarrier group at the Data Link and Physical Layers.

12 Claims, 30 Drawing Sheets

(56) References Cited

OTHER PUBLICATIONS

3GPP TS 36.300 V8.5.0 (May 2008); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); May 2008.

3GPP TS 36.321 V8.2.0 (May 2008); 3rd Generation Partnership Project; Technical Specification Group Radio Access Network; Evolved Universal Terrestrial Radio Access (E-UTRA) Medium Access Control (MAC) protocol specification (Release 8); May 2008.

* cited by examiner

|    | Users Selected for G1 (Circuit Block 10) | Users Selected for G2 (Circuit Block 20) | Users Selected for G3 (Circuit Block 30) | Users Selected for G4 (Circuit Block 40) |
|----|------|------------|------|------------------|
| t1 | A, B | D, E, F, G | I, J | K, L, M, N, O, P |
| t2 | C    | D, G       | I, J | K, L, M, N, O, P |
| t3 | C, A | G, D, E, F, H | I, J | K, L, M, N, O, P |

FIG. 5

|  | Users Selected for Band G1 (Block) | Users Selected for Band G2 (Block 2) | Users Selected for Band G3 (Block 3) | Users Selected for Band G4 (Block 3) |
|---|---|---|---|---|
| t=1 | A, D | E, F, G | I, J, K, L | M, N, O, P |
| t=2 | C, B | G | I, J | M, N, O, P |
| t=3 | C, D | G, E, F, H | I, J | M, N, O, P |

FIG. 25

WIRELESS BASE STATION AND SIGNAL PROCESSING METHOD

This is a continuation application of International Application PCT/JP2008/070214, filed on Nov. 6, 2008, the contents of which are herein wholly incorporated by reference.

FIELD

The present invention relates to wireless base stations which communicate wirelessly with wireless terminals according to OFDMA (Orthogonal Frequency Division Multi Access).

BACKGROUND

Currently, in the 3GPP (3rd Generation Partnership Project), LTE (Long Term Evolution) is under study with a view to dramatically improving high-speed data rate and frequency usage efficiencies and realizing low latency in order to cope with rapidly increasing multimedia traffic. In LTE, OFDMA (Orthogonal Frequency Division Multi Access) is employed as a wireless access scheme and improvements are being made on the performance (see 3GPP TS36.300 V8.5.0 (2008-05), 3GPP TS36.321 V8.2.0 (2008-05), and 3GPP TS36.211 V8.3.0 (2008-05), for example).

In wireless communication systems employing OFDMA, system bandwidth (subcarriers) may be widened in order to increase a maximum number of users to be handled or to raise the communication rate. In wireless communication systems wherein various system bandwidths exist, wireless base stations are previously implemented with the capacity to process a maximum system bandwidth so as to be able to cope with the various system bandwidths of the different wireless communication systems.

FIG. 29 is a block diagram of a wireless interface in a wireless base station. As illustrated in FIG. 29, the wireless interface of the wireless base station includes a Layer 2 processor 501 and a Layer 1 processor 502.

The Layer 2 processor 501 processes signals at the Data Link Layer and controls, for example, radio links and the allocation of radio resources. The Layer 1 processor 502 processes signals at the Physical Layer and performs, for example, baseband processing such as channel coding, modulation, and subcarrier mapping.

To enable a wireless base station to operate over a wide system bandwidth, devices having high processing capability and thus expensive are often used as the Layer 2 and Layer 1 processors 501 and 502. Where devices with moderate processing capability are used in order to prevent increase in cost, an additional circuit block including Layer 2 and Layer 1 processors 501 and 502 is often used.

Meanwhile, there has been provided a transmitter in which a plurality of subcarriers to be subjected to IDFT (Inverse Discrete Fourier Transformation) are divided into groups so that an oversampling process can be performed to make it unnecessary to increase the sampling frequency of digital-to-analog and analog-to-digital converters (see Japanese Laid-open Patent Publication No. 2003-224538, for example).

In cases where the circuit block including Layer 2 and Layer 1 processors is added in order to widen the system bandwidth, however, a problem arises in that since parameters are exchanged between the circuit blocks, the signal processing capability lowers due to increased load on the bus.

FIG. 30 illustrates the manner of how parameters are exchanged between layer processors. Compared with the wireless interface of FIG. 29, a wireless interface illustrated in FIG. 30 is additionally provided with a Layer 2 processor 511 and a Layer 1 processor 512 in order to process twice the system bandwidth.

In this case, the Layer 2 processors 501 and 511 exchange parameters with each other to determine, for example, the manner of how radio resources out of the entire system bandwidth are to be allocated to users. Also, the Layer 2 processors 501 and 511 exchange parameters with the Layer 1 processors 512 and 502, respectively, to determine the manner of how channel coding is to be executed within the entire system bandwidth. Consequently, the load on the bus increases, lowering the signal processing capability.

SUMMARY

According to an aspect of the invention, a wireless base station which communicates wirelessly with wireless terminals, includes: a plurality of signal processing circuits configured to process signals at data link and physical layers; and a plurality of transmission units configured to wirelessly transmit the signals processed by respective ones of the signal processing circuits, wherein the plurality of signal processing circuits are associated with respective subcarrier groups into which subcarriers are grouped, to process the signals at the data link and physical layers, and wherein a number of the plurality of signal processing circuits configured to process the signals is varied in accordance with a number of users managed by the wireless base station and a communication rate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 exemplifies users selected for the respective circuit blocks;

FIG. 25 exemplifies allocation of users to the respective circuit blocks;

DESCRIPTION OF EMBODIMENTS

Figure 1:
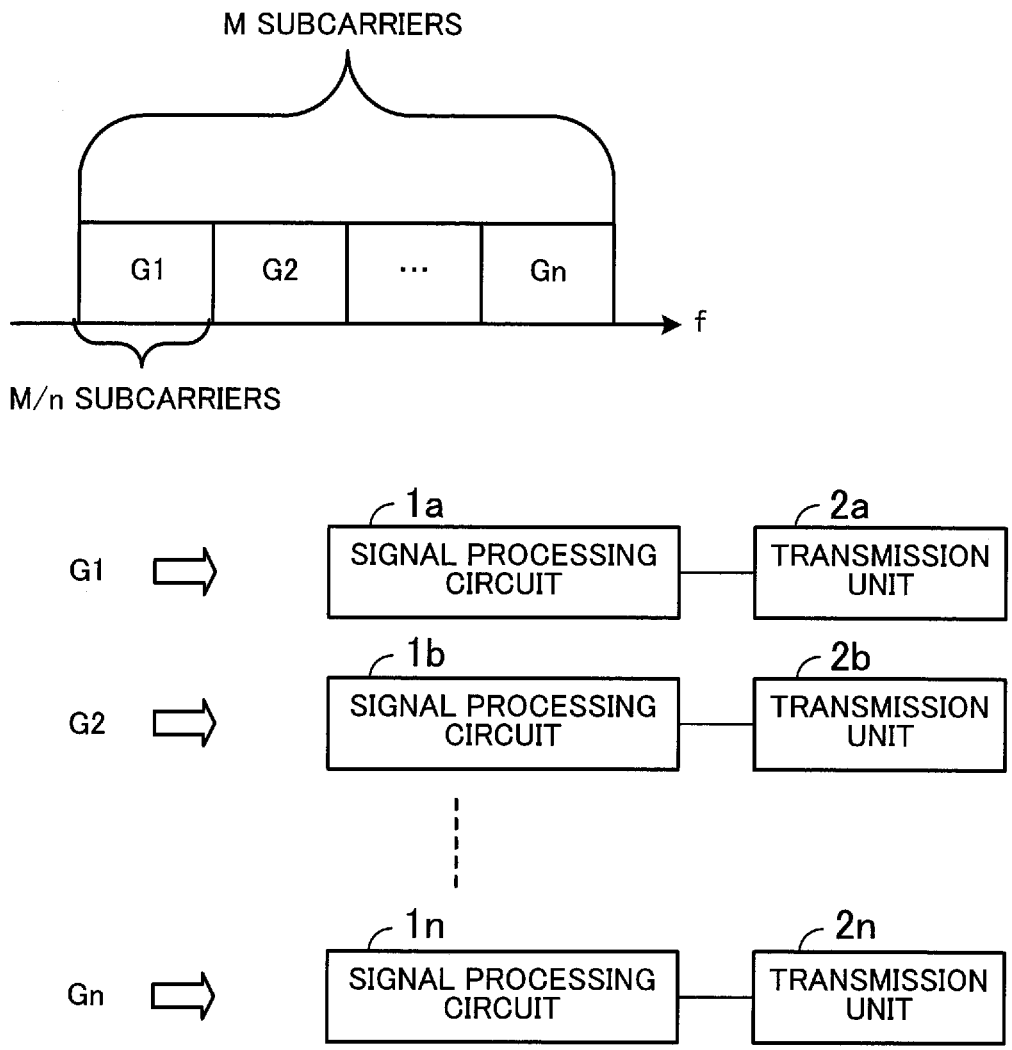
FIG. 1 illustrates signal processing in a wireless base station.

Embodiments of the present invention will be described below with reference to the accompanying drawings, wherein like reference numerals refer to like elements throughout.

FIG. 1 illustrates signal processing in a wireless base station. Specifically, FIG. 1 illustrates n signal processing circuits 1a to 1n provided in the wireless base station, and a system bandwidth (M subcarriers) processed by the wireless base station. FIG. 1 also illustrates transmission units 2a to 2n that wirelessly transmit signals processed by the respective processing circuits 1a to 1n. The signal processing circuits 1a to 1n are constituted by respective independent circuit blocks and process signals at the Data link and Physical Layers. Each of the signal processing circuits 1a to 1n is associated with a corresponding one of a plurality of subcarrier groups, to perform signal processing at the Data link and Physical Layers.

For example, the M subcarriers are divided into n groups G1 to Gn, as illustrated in FIG. 1. The signal processing circuit 1a independently processes signals of the group G1 at the Data link and Physical Layers, the signal processing circuit 1b independently processes signals of the group G2 at the Data link and Physical Layers, and so on. The signal processing circuit 1n independently processes signals of the group Gn at the Data link and Physical Layers. The transmission units 2a to 2n wirelessly transmit the signals processed by the signal processing circuits 1a to 1n.

In this manner, the wireless base station divides the system bandwidth to be processed thereby into the multiple groups G1 to Gn and causes the signal processing circuits 1a to 1n constituted by respective independent circuit blocks to process signals of the respective subcarrier groups G1 to Gn.

This permits the signal processing circuits 1a to 1n to process signals at the Data link and Physical Layers without the need to exchange parameters with each other, whereby the system bandwidth can be widened without increasing the load on the bus.

A first embodiment will be now described in detail with reference to the drawings.

Figure 2:
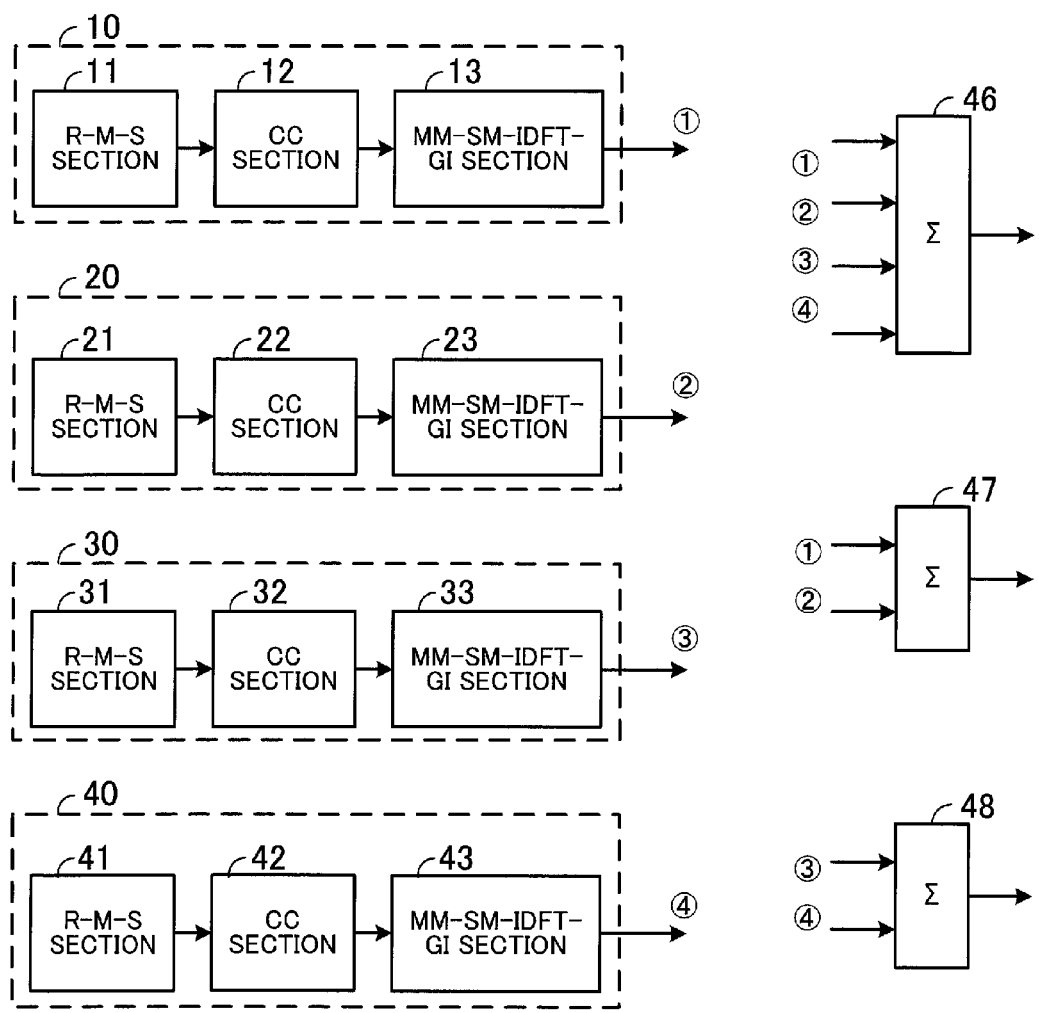
FIG. 2 is a block diagram of a wireless interface in a wireless base station according to a first embodiment.

FIG. 2 is a block diagram of a wireless interface in a wireless base station according to the first embodiment. As illustrated in FIG. 2, the wireless interface includes circuits blocks 10, 20, 30 and 40, and adders 46 to 48. For example, the wireless base station is provided with a Central Processing Unit (CPU) or Digital Signal Processor (DSP), not illustrated, and a signal subjected to baseband processing by the CPU or DSP is input to the wireless interface.

The circuit block 10 has an R-M-S section 11, a CC section 12, and an MM-SM-IDFT-GI section 13. Like the circuit block 10, the other circuits blocks 20, 30 and 40 respectively include R-M-S sections 21, 31 and 41, CC sections 22, 32 and 42, and MM-SM-IDFT-GI sections 23, 33 and 43. In the following, the circuit block 10 alone will be explained.

The R-M-S section 11 performs processes on Layer 2 as defined in the OSI reference model (Open System Interconnection reference model). Although not illustrated, the R-M-S section 11 includes an RLC (Radio Link Control) unit, a MAC (Medium Access Control) unit, and a scheduling unit.

The RLC unit performs radio link control, a process for segmenting data into a transport block size, and an ARQ (Automatic Repeat reQuest) process for correcting errors that failed to be remedied by HARQ (Hybrid Automatic Repeat reQuest).

The MAC unit assists the transmission of signals at Layer 1 (through the CC section 12 and the MM-SM-IDFT-GI section 13). The MAC unit performs radio resource allocation control, a process for determining a transport block size that can be transmitted, and a HARQ process for correcting errors.

The scheduling unit performs electric power control for transmit signals, HARQ control, scheduling for individual users, and priority control.

The CC section 12 performs processes on Layer 1 in the OSI reference model. The CC section 12 performs channel coding including CRC (Cyclic Redundancy Checking) attachment, convolution, turbo encoding, rate matching, RB segmentation and interleaving.

The MM-SM-IDFT-GI section 13 performs processes on Layer 1 in the OSI reference model. Although not illustrated, the MM-SM-IDFT-GI section 13 includes a modulating mapping unit, a subcarrier mapping unit, an IDFT unit, and a GI (Guard Interval) unit.

The modulation mapping unit performs a modulation process such as 16 QAM (Quadrature Amplitude Modulation) and 64 QAM.

The subcarrier mapping unit maps modulating data onto an OFDM subcarrier (resource element).

The IDFT unit converts the subcarrier to a signal (sampling data) on the time axis.

The GI unit performs a guard interval process on the sampling data.

The adders 46 to 48 add up electric power levels of the transmit data output from the circuit blocks 10, 20, 30 and 40, and output the results for transmission through the air.

In FIG. 2, the outputs of the respective circuit blocks 10, 20, 30 and 40, indicated by the arrows with encircled numbers, are connected to the inputs of the adders 46 to 48 in the manner indicated by the arrows with the corresponding encircled numbers. Accordingly, the adder 46 adds up the electric power levels of the signals output from the circuit blocks 10, 20, 30 and 40, and outputs the result for transmission through the air. The adder 47 adds up the electric power levels of the signals output from the circuit blocks 10 and 20 and outputs the result for transmission through the air, and the adder 48 adds up the electric power levels of the signals output from the circuit blocks 30 and 40 and outputs the result for transmission through the air.

Figure 3:
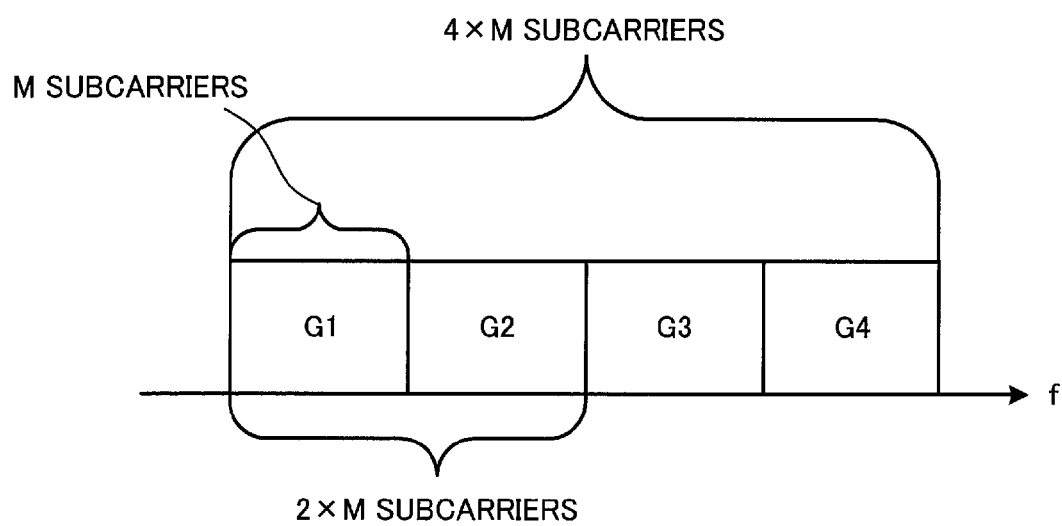
FIG. 3 illustrates a system bandwidth processed by circuit blocks.

FIG. 3 illustrates a system bandwidth processed by the circuit blocks. It is assumed here that the circuit blocks 10, 20, 30 and 40 illustrated in FIG. 2 each have the capability to process M subcarriers of the system bandwidth, and that the system bandwidth to be processed by the wireless base station is 4×M subcarriers.

In this case, the wireless interface illustrated in FIG. 2 divides the system bandwidth of 4×M subcarriers equally into groups G1 to G4, as illustrated in FIG. 3, so that the circuit blocks 10, 20, 30 and 40 may process respective M subcarriers of the groups G1 to G4 of the system bandwidth.

For example, the circuit block 10 processes the group G1 of the system bandwidth. The circuit block 20 processes the group G2 of the system bandwidth, and the circuit block 30 processes the group G3 of the system bandwidth. The circuit block 40 processes the group G4 of the system bandwidth.

Thus, the system bandwidth is divided into the groups G1 to G4, and the groups G1 to G4 of the system bandwidth are processed by the respective circuit blocks 10, 20, 30 and 40 so that the output electric power levels of the circuit blocks 10, 20, 30 and 40 may be added up. Since it is unnecessary to exchange parameters between the circuit blocks 10, 20, 30 and 40, the load on the bus can be reduced, making it possible to improve the processing capacity.

Where a system bandwidth of 2×M subcarriers is to be processed by the wireless base station, two out of the four circuit blocks 10, 20, 30 and 40 suffice. In this case, the groups G1 and G2 of the system bandwidth are processed by the respective two circuit blocks 10 and 20, for example, of the wireless base station, and the transmit signal is output from the adder 47 for transmission through the air. Alternatively, the groups G3 and G4 of the system bandwidth are processed by the two circuit blocks 30 and 40, respectively, and the transmit signal is output from the adder 48 for transmission through the air.

The manner of how the system bandwidth is processed in the wireless interface will be now explained. In the following, it is assumed that the wireless interface illustrated in FIG. 2 is provided only with the two circuit blocks 10 and 20 and the adder 47, for ease of explanation.

Figure 4:
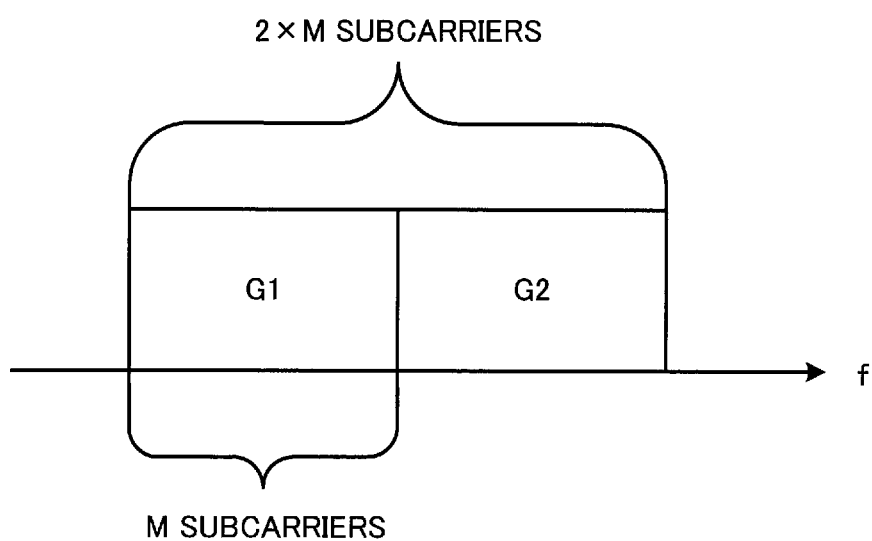
FIG. 4 illustrates a system bandwidth processed by the circuit blocks.

FIG. 4 illustrates a system bandwidth to be processed by the circuit blocks. As illustrated, the system bandwidth to be processed by the wireless base station is 2×M subcarriers. Since the wireless interface has two circuit blocks 10 and 20, the system bandwidth of 2×M subcarriers is divided equally into groups G1 and G2. The two circuit blocks 10 and 20 process the M subcarriers of the respective groups G1 and G2.

The following Equation (1) represents a general formula for IDFT:

[Equation 1]

$$f(n) = (1/N)\sum_{k=0}^{N-1} F(k) W_N^{-kn} \quad (1)$$

$$(n = 0, 1, \ldots, N-1 \; k = 0, 1, \ldots, N-1 \; W_N = \exp(-j2\pi \cdot N))$$

F(k) indicates the subcarriers, f(n) indicates sampling data, and $W_N$ indicates a rotator.

Provided the system bandwidth illustrated in FIG. 4 is subcarriers (M=4), for example, N=8 applies to Equation (1), and the equation can be expressed by the following matrix (2):

[Equation 2]

$$\begin{pmatrix} f(0) \\ f(1) \\ f(2) \\ f(3) \\ f(4) \\ f(5) \\ f(6) \\ f(7) \end{pmatrix} = \begin{pmatrix} W^0 & W^0 & W^0 & W^0 & W^0 & W^0 & W^0 & W^0 \\ W^0 & W^1 & W^2 & W^3 & W^4 & W^5 & W^6 & W^7 \\ W^0 & W^2 & W^4 & W^6 & W^8 & W^{10} & W^{12} & W^{14} \\ W^0 & W^3 & W^6 & W^9 & W^{12} & W^{15} & W^{18} & W^{21} \\ W^0 & W^4 & W^8 & W^{12} & W^{16} & W^{20} & W^{24} & W^{28} \\ W^0 & W^5 & W^{10} & W^{15} & W^{20} & W^{25} & W^{30} & W^{35} \\ W^0 & W^6 & W^{12} & W^{18} & W^{24} & W^{30} & W^{36} & W^{42} \\ W^0 & W^7 & W^{14} & W^{21} & W^{28} & W^{35} & W^{42} & W^{49} \end{pmatrix} \begin{pmatrix} F(0) \\ F(1) \\ F(2) \\ F(3) \\ F(4) \\ F(5) \\ F(6) \\ F(7) \end{pmatrix} \quad (2)$$

In Equation (2), F(0) to F(7) correspond to 2×4 (M=4) subcarriers, respectively, in FIG. 4. As stated above, the circuit block 10 processes the subcarriers F(0) to F(3) belonging to the group G1. Accordingly, the circuit block 10 performs an arithmetic operation indicated by the following Equation (3):

[Equation 3]

$$\begin{pmatrix} f_1(0) \\ f_1(1) \\ f_1(2) \\ f_1(3) \\ f_1(4) \\ f_1(5) \\ f_1(6) \\ f_1(7) \end{pmatrix} = \begin{pmatrix} W^0 & W^0 & W^0 & W^0 & W^0 & W^0 & W^0 & W^0 \\ W^0 & W^1 & W^2 & W^3 & W^4 & W^5 & W^6 & W^7 \\ W^0 & W^2 & W^4 & W^6 & W^8 & W^{10} & W^{12} & W^{14} \\ W^0 & W^3 & W^6 & W^9 & W^{12} & W^{15} & W^{18} & W^{21} \\ W^0 & W^4 & W^8 & W^{12} & W^{16} & W^{20} & W^{24} & W^{28} \\ W^0 & W^5 & W^{10} & W^{15} & W^{20} & W^{25} & W^{30} & W^{35} \\ W^0 & W^6 & W^{12} & W^{18} & W^{24} & W^{30} & W^{36} & W^{42} \\ W^0 & W^7 & W^{14} & W^{21} & W^{28} & W^{35} & W^{42} & W^{49} \end{pmatrix} \begin{pmatrix} F(0) \\ F(1) \\ F(2) \\ F(3) \\ 0 \\ 0 \\ 0 \\ 0 \end{pmatrix} \quad (3)$$

The circuit block 20 processes the subcarriers F(4) to F(7) belonging to the group G2. Thus, the circuit block 10 performs an arithmetic operation indicated by the following Equation (4):

[Equation 4]

$$\begin{pmatrix} f_2(0) \\ f_2(1) \\ f_2(2) \\ f_2(3) \\ f_2(4) \\ f_2(5) \\ f_2(6) \\ f_2(7) \end{pmatrix} = \begin{pmatrix} W^0 & W^0 & W^0 & W^0 & W^0 & W^0 & W^0 & W^0 \\ W^0 & W^1 & W^2 & W^3 & W^4 & W^5 & W^6 & W^7 \\ W^0 & W^2 & W^4 & W^6 & W^8 & W^{10} & W^{12} & W^{14} \\ W^0 & W^3 & W^6 & W^9 & W^{12} & W^{15} & W^{18} & W^{21} \\ W^0 & W^4 & W^8 & W^{12} & W^{16} & W^{20} & W^{24} & W^{28} \\ W^0 & W^5 & W^{10} & W^{15} & W^{20} & W^{25} & W^{30} & W^{35} \\ W^0 & W^6 & W^{12} & W^{18} & W^{24} & W^{30} & W^{36} & W^{42} \\ W^0 & W^7 & W^{14} & W^{21} & W^{28} & W^{35} & W^{42} & W^{49} \end{pmatrix} \begin{pmatrix} 0 \\ 0 \\ 0 \\ 0 \\ F(4) \\ F(5) \\ F(6) \\ F(7) \end{pmatrix} \quad (4)$$

The results of the arithmetic operations by the circuit blocks 10 and 20 are added together by the adder 47. That is, the results of the arithmetic operations indicated by Equations (3) and (4) are added together, as indicated by the following Equation (5), to obtain the output to be transmitted through the air:

[Equation 5]

$$\begin{pmatrix} f(0) \\ f(1) \\ f(2) \\ f(3) \\ f(4) \\ f(5) \\ f(6) \\ f(7) \end{pmatrix} = \begin{pmatrix} f_1(0) \\ f_1(1) \\ f_1(2) \\ f_1(3) \\ f_1(4) \\ f_1(5) \\ f_1(6) \\ f_1(7) \end{pmatrix} + \begin{pmatrix} f_2(0) \\ f_2(1) \\ f_2(2) \\ f_2(3) \\ f_2(4) \\ f_2(5) \\ f_2(6) \\ f_2(7) \end{pmatrix} \quad (5)$$

The result of Equation (5) equals that of Equation (2). In other words, Equation (5) proves that by dividing the subcarriers into groups, then processing the groups by the respective circuit blocks 10 and 20 and adding the processing results together, it is possible to process the signals of all subcarriers of the system bandwidth, without the need to exchange parameters between the circuit blocks 10 and 20.

The following describes the manner of how radio resources are allocated at the wireless interface. Let it be assumed that, in the system bandwidth illustrated in FIG. 3, the group G1 of the system bandwidth is allocated to users (wireless terminals such as mobile phones) A, B and C, the group G2 of the system bandwidth is allocated to users D, E, F, G and H, the group G3 of the system bandwidth is allocated to users I and J, and the group G4 of the system bandwidth is allocated to users K, L, M, N, O and P. The individual users are allocated their respective radio resources (subcarriers) by the scheduling units of the respective R-M-S sections in the circuit blocks 10, 20, 30 and 40.

FIG. 5 exemplifies the users selected for the respective circuit blocks. Let it be assumed that the users are selected at the circuit blocks 10, 20, 30 and 40 at respective times t1, t2 and t3 as illustrated in FIG. 5.

For example, at time t1, the subcarriers of the group G1 are allocated to the users A and B by the circuit block 10, and the subcarriers of the group G2 are allocated to the users D, E, F and G by the circuit block 20. Likewise, the subcarriers of the group G3 are allocated to the users I and J by the circuit block 30, and the subcarriers of the group G4 are allocated to the users K, L, M, O and P by the circuit block 40.

Figure 6:
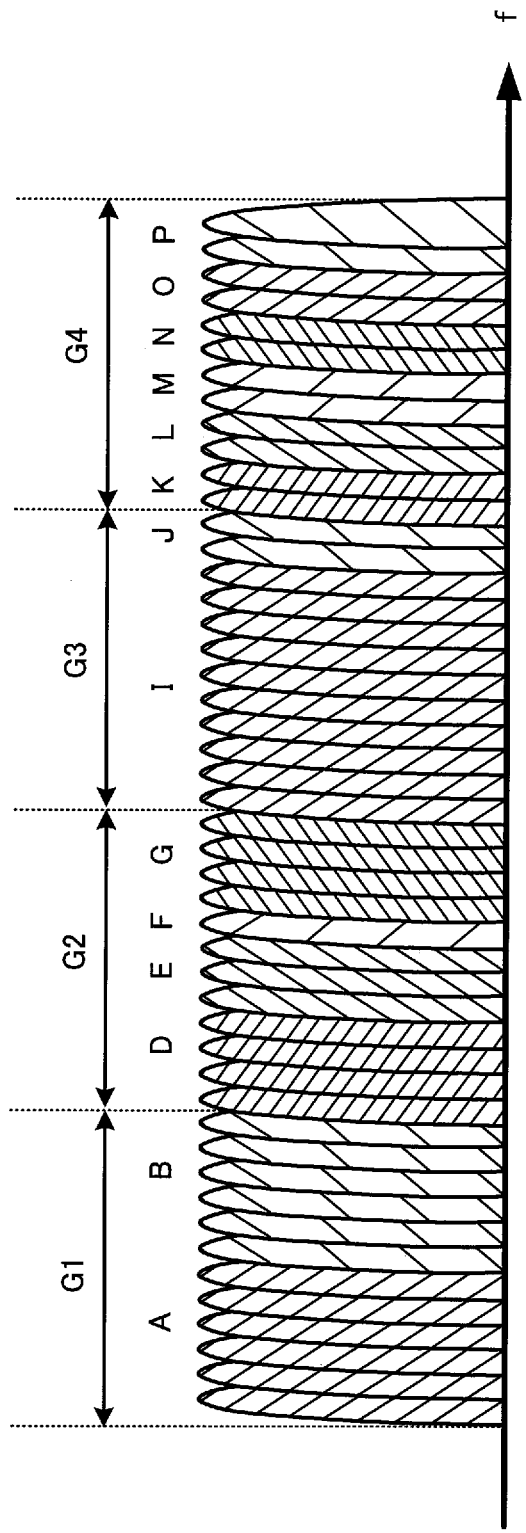
FIG. 6 is a conceptual diagram exemplifying allocation of users within an entire system bandwidth at time t1.

FIG. 6 is a conceptual diagram exemplifying allocation of users within the entire system bandwidth at time t1. At time t1, the subcarriers are allocated to the respective users as illustrated in FIG. 6.

Figure 7:
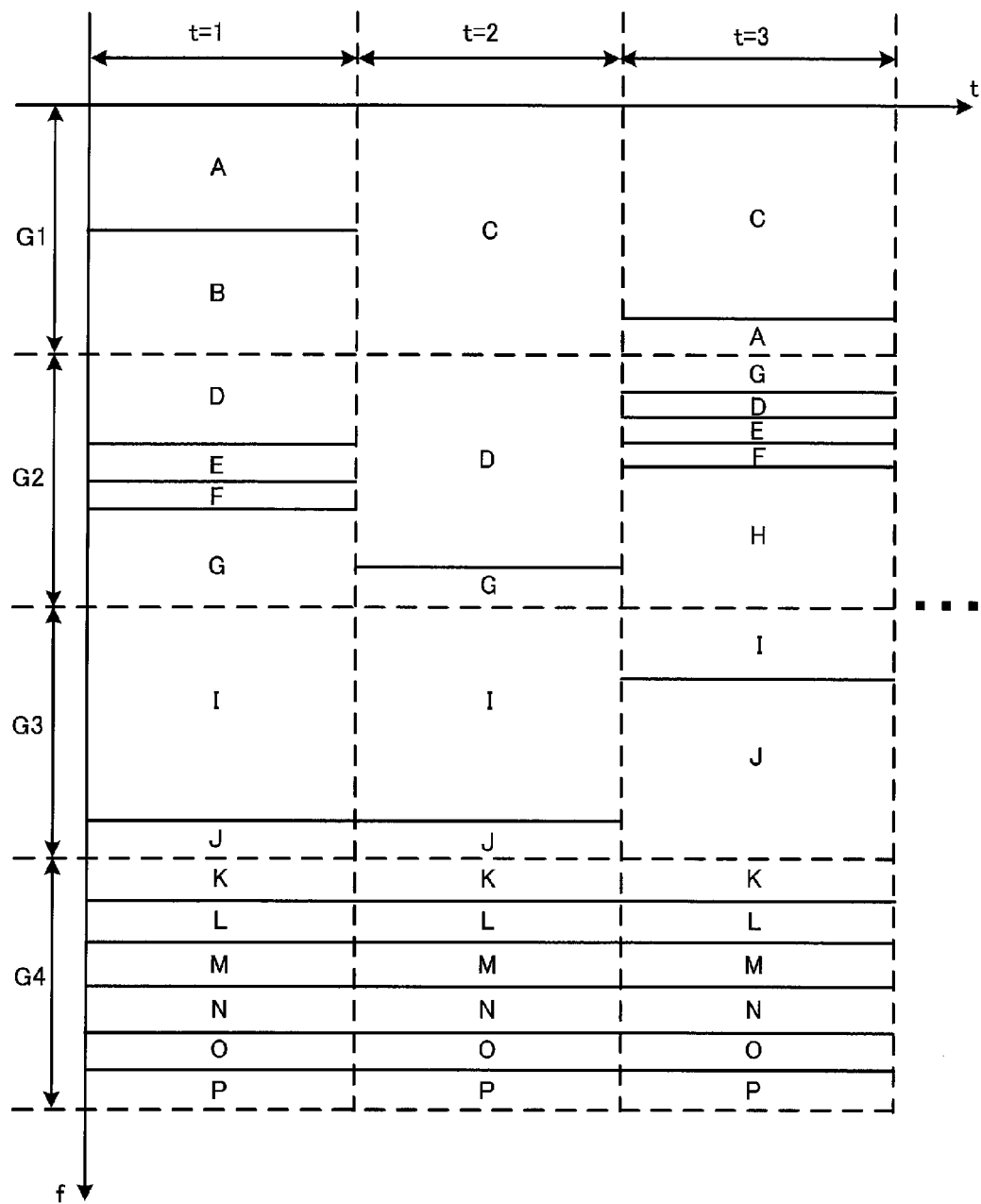
FIG. 7 illustrates scheduling for the users along time and frequency axes, the users being allocated in the manner illustrated in FIG. 5.

FIG. 7 illustrates scheduling for the users exemplified in FIG. 5 along time and frequency axes. The scheduling units of the R-M-S sections 11, 21, 31 and 41 independently allocate the subcarriers to the users at respective times t1, t2 and t3 as illustrated in FIG. 7, for example.

In this manner, the system bandwidth is divided into groups, and the circuit blocks 10, 20, 30 and 40 are caused to process the signals of the respective groups G1 to G4 of the system bandwidth. Then, the electric power levels of the transmit signals obtained through the processing of the system bandwidth by the circuit blocks 10, 20, 30 and 40 are added up and output for transmission through the air. It is therefore unnecessary to exchange parameters between the circuit blocks 10, 20, 30 and 40, whereby the load on the bus is reduced, making it possible to restrain lowering in the processing capacity.

The number of the circuit blocks 10, 20, 30 and 40 illustrated in FIG. 2 may be varied in accordance with the number of users that the wireless base station can manage or the communication rate.

Specifically, a switching device is provided which activates the circuit blocks 10, 20, 30 and 40 in accordance with the number of users or the communication rate. For example, a switching device for turning on and off the power supply to the circuit blocks 10, 20, 30 and 40 may be provided. The switching device is operated such that the number of the activated circuit blocks 10, 20, 30 and 40 is increased when the number of users or the communication rate is to be increased.

Also, the switching device is configured to activate a suitable one of the adders 46 to 48 depending on which ones of the circuit blocks 10, 20, 30 and 40 are activated. For example, when all of the circuit blocks 10, 20, 30 and 40 are to be activated, the switching device activates the adder 46. When the circuit blocks 10 and 20 are to be activated, the switching device activates the adder 47, and when the circuit blocks 30 and 40 are to be activated, the switching device activates the adder 48.

Accordingly, where the circuit blocks 10, 20, 30 and 40 and the adder 46 have been activated in accordance with the number of users or the communication rate, the wireless base station can process a system bandwidth of 4×M subcarriers. Also, where the circuit blocks 10 and 20 and the adder 47 or the circuit blocks 30 and 40 and the adder 48 have been activated, the wireless base station can process a system bandwidth of 2×M subcarriers.

A second embodiment will be now described in detail with reference to the drawings. In the second embodiment, codes are used for identical subcarriers to multiplex transmit signals.

Figure 8:
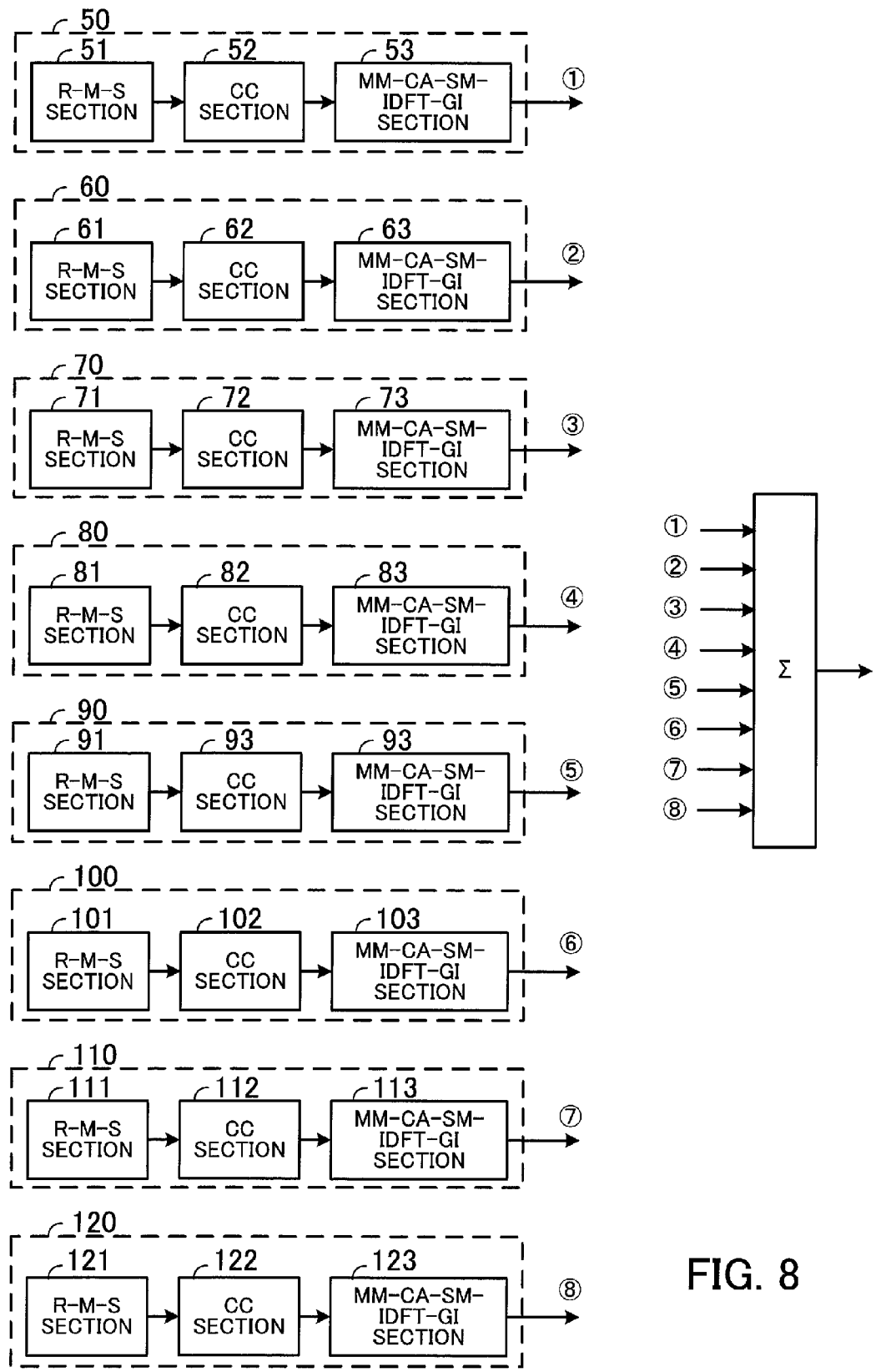
FIG. 8 is a block diagram of a wireless interface in a wireless base station according to a second embodiment.

FIG. 8 is a block diagram of a wireless interface in a wireless base station according to the second embodiment. As illustrated in FIG. 8, the wireless interface includes circuit blocks 50, 60, 70, 80, 90, 100, 110 and 120. The circuit blocks 50, 60, 70, 80, 90, 100, 110 and 120 perform identical processes. In the following, therefore, the circuit block 50 alone will be explained.

The circuit block 50 has an R-M-S section 51, a CC section 52, and an MM-CA-SM-IDFT-GI section 53. The R-M-S section 51 and the CC section 52 are respectively identical with the R-M-S section 11 and the CC section 12 explained above with reference to FIG. 2, and therefore, description thereof is omitted.

The MM-CA-SM-IDFT-GI section 53 performs processes on the Layer 1 in the OSI reference model. Like the MM-SM-IDFT-GI section explained above with reference to FIG. 2, the MM-CA-SM-IDFT-GI section 53 has a modulation mapping (MM) unit, a subcarrier mapping (SM) unit, an IDFT (IDFT) unit, and a GI (GI) unit. In addition, the MM-CA-SM-IDFT-GI section 53 includes a code allocation unit, not shown, for multiplying data by codes. The multiple circuit blocks 50, 60, 70, 80, 90, 100, 110 and 120 perform a process for multiplexing identical subcarriers of the system bandwidth by multiplying transmit symbol data by codes in the respective code allocation units.

Figure 9:
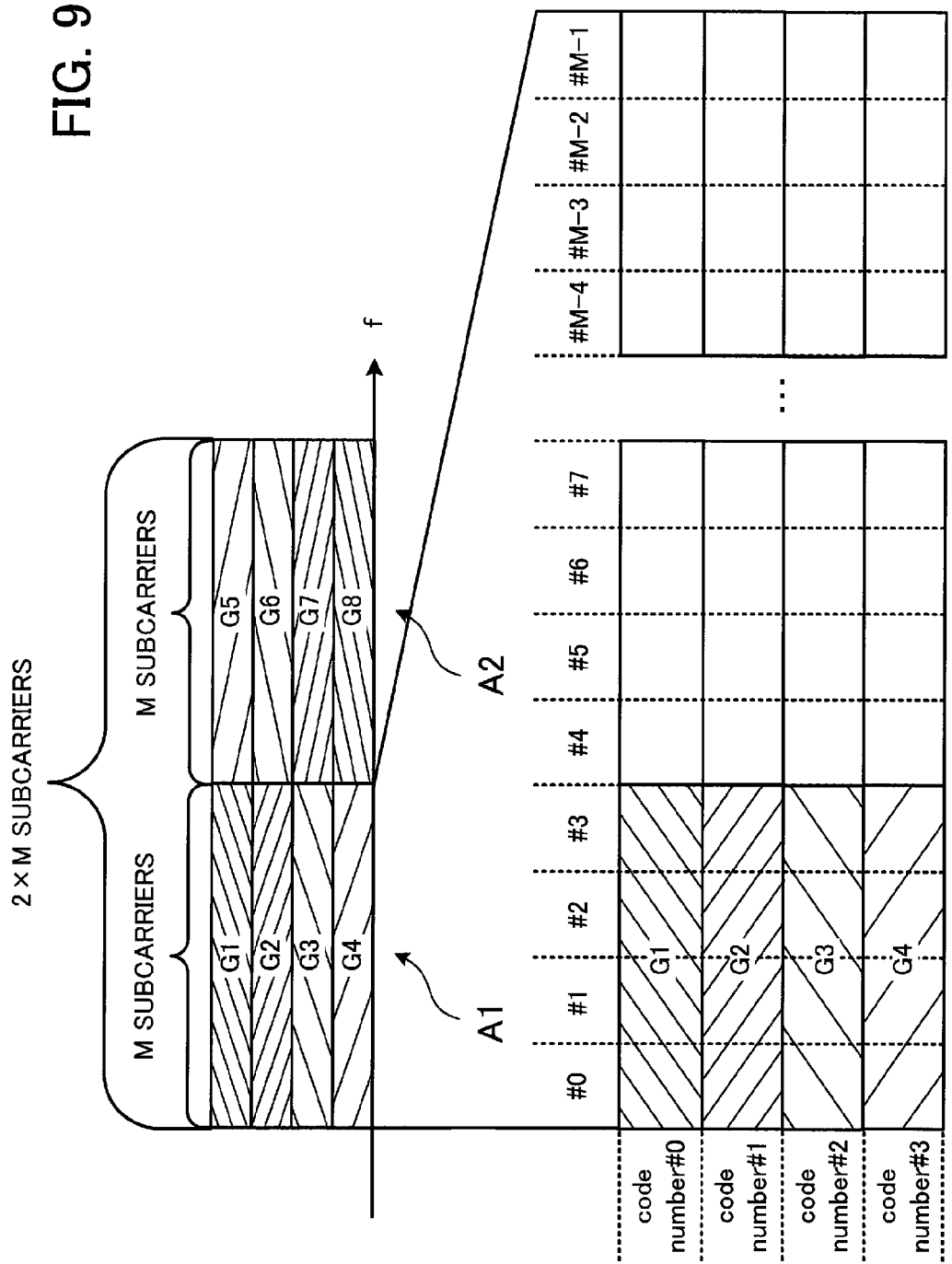
FIG. 9 illustrates a system bandwidth processed by circuit blocks.

FIG. 9 illustrates a system bandwidth processed by the circuit blocks. In the upper part of FIG. 9, a system bandwidth of 2×M subcarriers is illustrated. As illustrated in FIG. 9, the system bandwidth of 2×M subcarriers is divided equally into two M subcarriers, which are then further subdivided (multiplexed using four codes) into groups G1 to G4 and groups G5 to G8, respectively.

The subcarriers of the groups G1 to G4 are illustrated in detail in the lower part of FIG. 9. The subcarriers #0 to #3 are multiplexed using four codes with code numbers #0 to #3.

Let us suppose that each of the circuit blocks 50, 60, 70, 80, 90, 100, 110 and 120 illustrated in FIG. 8 has the capability to process M subcarriers of the system bandwidth. The circuit blocks 50, 60, 70 and 80 process the respective M subcarriers of the system bandwidth indicated by arrow A1 in FIG. 9, and the circuit blocks 90, 100, 110 and 120 process the respective M subcarriers of the system bandwidth indicated by arrow A2.

More specifically, the circuit block 50 processes the group G1 of the system bandwidth illustrated in FIG. 9, and so on. The circuit block 80 processes the group G4 of the system bandwidth. The circuit block 90 process the group G5 of the system bandwidth, and so on. The circuit block 120 processes the group G8 of the system bandwidth. The set of the circuit blocks 50, 60, 70 and 80 and the set of the circuit blocks 90, 100, 110 and 120 individually process identical subcarriers of the system bandwidth, but since the transmit symbol data is multiplexed using four codes by the code allocation units, each set of the circuit blocks can process signals of the identical subcarriers.

Code multiplexing will be now explained. Equation (6) below represents code multiplexing in accordance with a Hadamard matrix.

[Equation 6]

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} P_1 \times e^{j\theta_1} \\ P_2 \times e^{j\theta_2} \\ P_3 \times e^{j\theta_3} \\ P_4 \times e^{j\theta_4} \end{pmatrix} = \begin{pmatrix} \text{Subcarrier } \#2n \ Tx \ \text{Power} \\ \text{Subcarrier } \#2n+1 \ Tx \ \text{Power} \\ \text{Subcarrier } \#2n+2 \ Tx \ \text{Power} \\ \text{Subcarrier } \#2n+3 \ Tx \ \text{Power} \end{pmatrix} \quad (6)$$

The 4×4 matrix on the left-hand side of Equation (6) represents a Hadamard matrix, and the 4×1 matrix on the left-hand side represents Tx (transmit) symbol data. In the Tx symbol data, $P_1$ to $P_4$ indicate transmit powers, and $e^{j\theta_1}$ to $e^{j\theta_4}$ indicate phases of the symbol data. The right-hand side of the equation indicates transmit powers of the subcarriers #2n to #2n+3.

Where n on the right-hand side of Equation (6) is "0", the four entries on the right-hand side correspond to #0 to #3, respectively, illustrated in FIG. 9. Namely, "Subcarrier #0 Tx Power" in Equation (6) corresponds to #0 in FIG. 9 and indicates that the transmit data of the circuit blocks 50, 60, 70 and 80 illustrated in FIG. 8 have been multiplexed using four codes into "Subcarrier #0" according to the Hadamard matrix.

Figure 10:
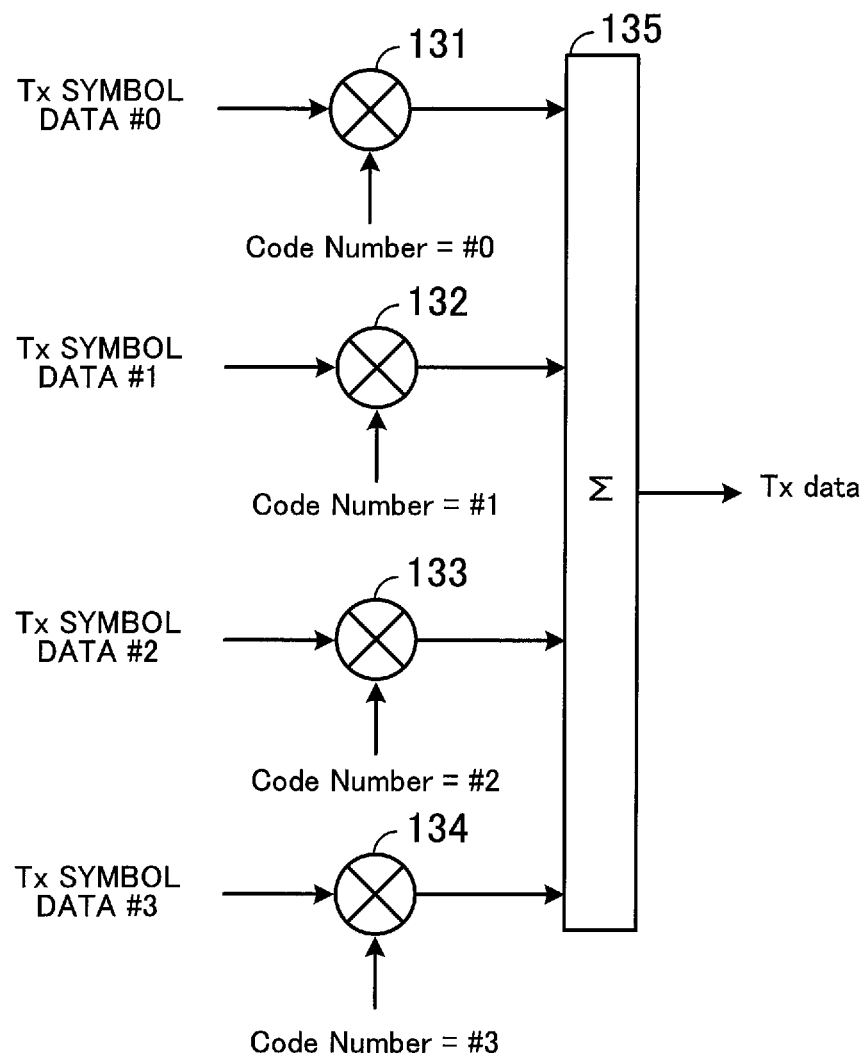
FIG. 10 is a block diagram illustrating the manner of how code multiplexing is implemented.

FIG. 10 is a block diagram illustrating the manner of how the code multiplexing is implemented. The arithmetic operation indicated by Equation (6) can be implemented by multipliers 131 to 134 and an adder 135 illustrated in FIG. 10.

In FIG. 10, Tx symbol data #0 to #3 indicate the data output from the respective MM units of the circuit blocks 50, 60, 70 and 80, and correspond to the 4×1 matrix on the left-hand side of Equation (6). Code numbers #0 to #3 respectively correspond to the code numbers indicated in FIG. 9 and also correspond to the 4×4 matrix in Equation (6). The output of the adder 135 corresponds to the subcarriers #0 to #3 in FIG. 9 and also corresponds to the right-hand side of Equation (6).

Figure 11:
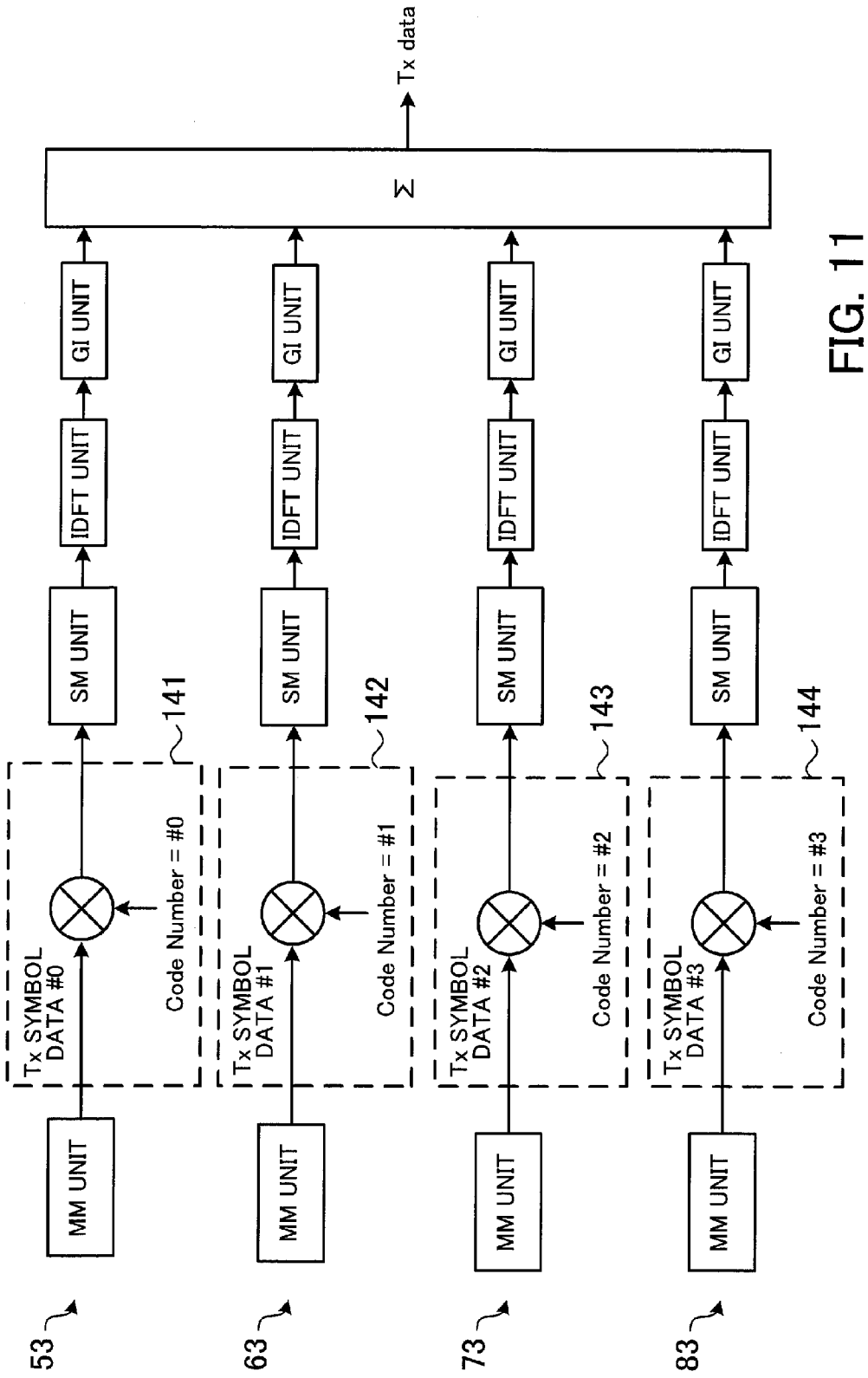
FIG. 11 is a detailed block diagram illustrating an MM-CA-SM-IDFT-GI section of the circuit blocks.

FIG. 11 is a detailed block diagram of the MM-CA-SM-IDFT-GI sections of the circuit blocks. Specifically, FIG. 11 illustrates blocks of the MM-CA-SM-IDFT-GI sections 53, 63, 73 and 83 of the circuit blocks 50, 60, 70 and 80 illustrated in FIG. 8. As illustrated in FIG. 11, the MM-CA-SM-IDFT-GI sections 53, 63, 73 and 83 include code allocation units 141 to 144, respectively.

The MM-CA-SM-IDFT-GI sections 53, 63, 73 and 83 process the part of the system bandwidth indicated by the arrow A1 in FIG. 9. At this time, in the MM-CA-SM-IDFT-GI sections 53, 63, 73 and 83, the Tx symbol data output from the respective MM units are multiplexed using the four codes by the code allocation units 141 to 144.

Although not illustrated in FIG. 11, the MM-CA-SM-IDFT-GI sections 93, 103, 113 and 123 of the circuit blocks 90, 100, 110 and 120 illustrated in FIG. 8 also include blocks identical with those illustrated in FIG. 11, to process the part of the system bandwidth indicated by the arrow A2 in FIG. 9 and multiplex the Tx symbol data by using four codes.

In FIG. 11, the SM, IDFT and GI units of the MM-CA-SM-IDFT-GI sections 53, 63, 73 and 83 are respectively identical units and may individually be implemented by a single common unit.

Figure 12:
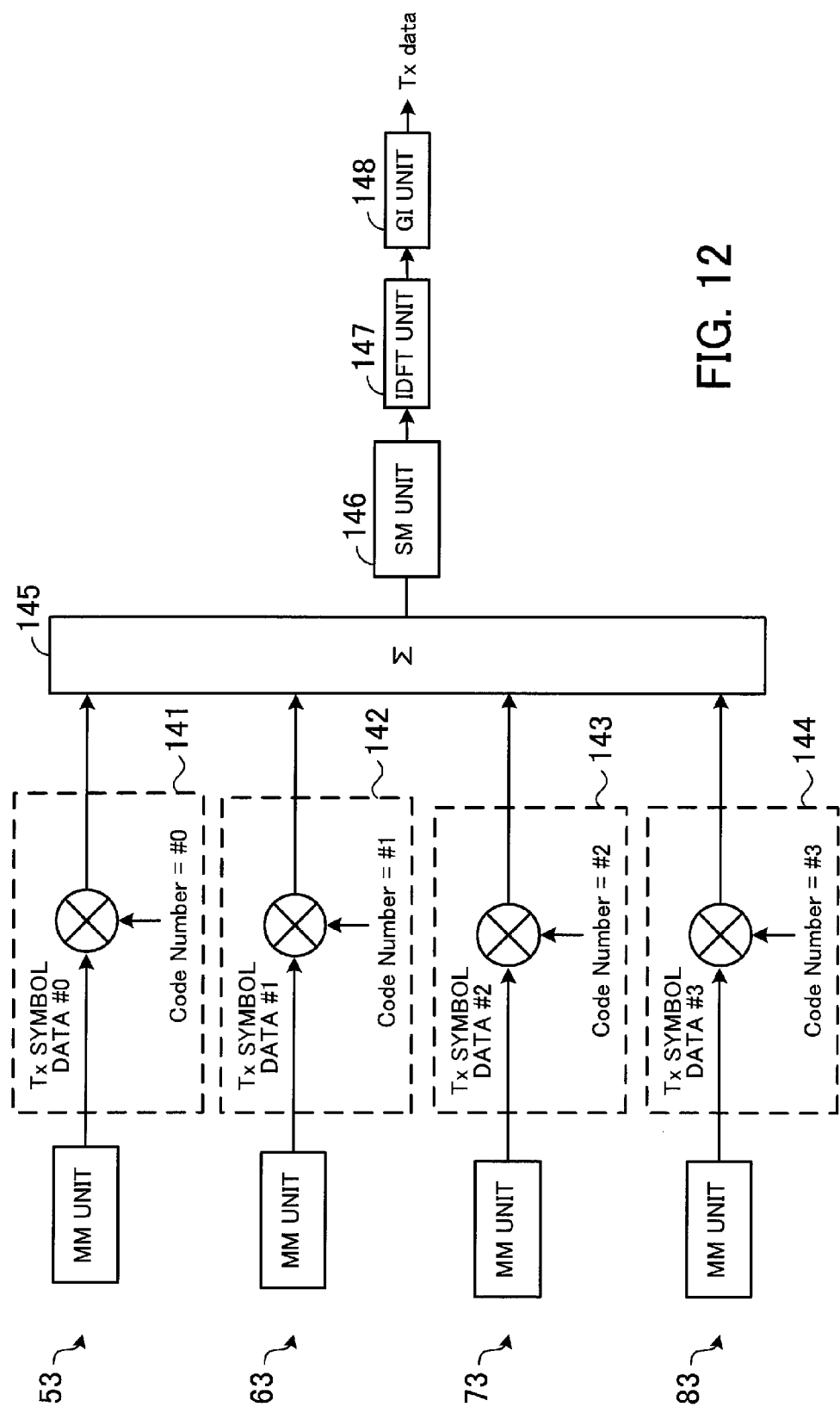
FIG. 12 is a block diagram illustrating a circuit as an alternative to the one illustrated in FIG. 11.

FIG. 12 is a block diagram illustrating a circuit as an alternative to the one illustrated in FIG. 11. In FIG. 12, like reference numerals are used to denote like elements appearing in FIG. 11, and description of such elements is omitted.

In the block diagram of FIG. 12, an SM unit 146, an IDFT unit 147 and a GI unit 148 are shared by the circuit blocks, as compared with the block diagram of FIG. 11. An adder 145 adds up the outputs of the code allocation units 141 to 144 and outputs the result of the addition to the common SM, IDFT and GI units 146, 147 and 148.

Thus, by performing code multiplexing in the circuit blocks 50, 60, 70, 80, 90, 100, 110 and 120, it is possible to transmit more information.

A third embodiment will be now described in detail with reference to the drawings. In the first embodiment, the divided subcarrier groups are individually continuous in terms of frequency. According to the third embodiment, the subcarriers are grouped so as to be dispersed in terms of frequency, and the subcarrier groups are processed by the respective circuit blocks.

Figure 13:
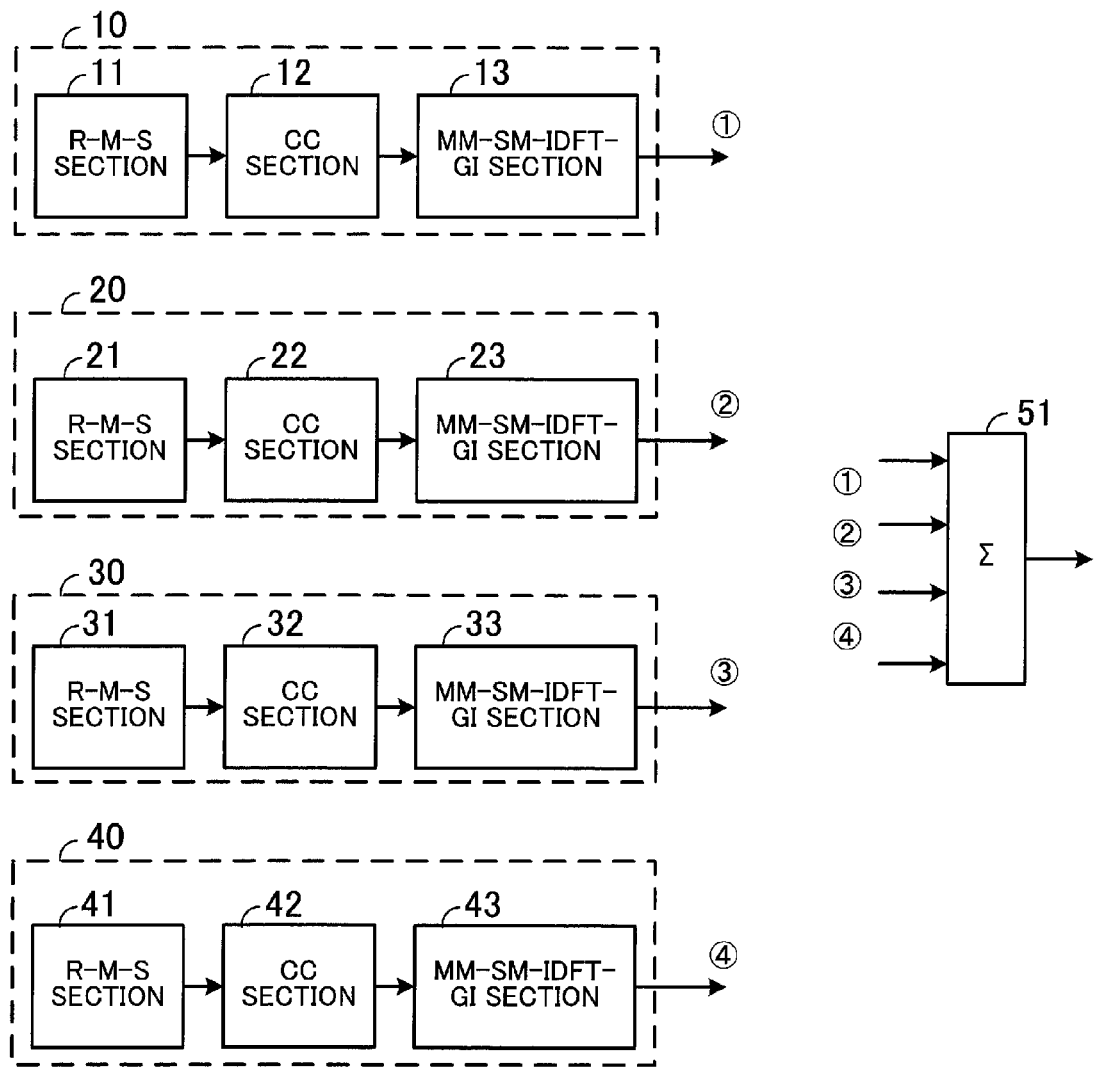
FIG. 13 is a block diagram of a wireless interface in a wireless base station according to a third embodiment.

FIG. 13 is a block diagram of a wireless interface in a wireless base station according to the third embodiment. In the wireless interface illustrated in FIG. 13, like reference numerals refer to like elements also appearing in FIG. 2, and description of such elements is omitted.

Figure 14:
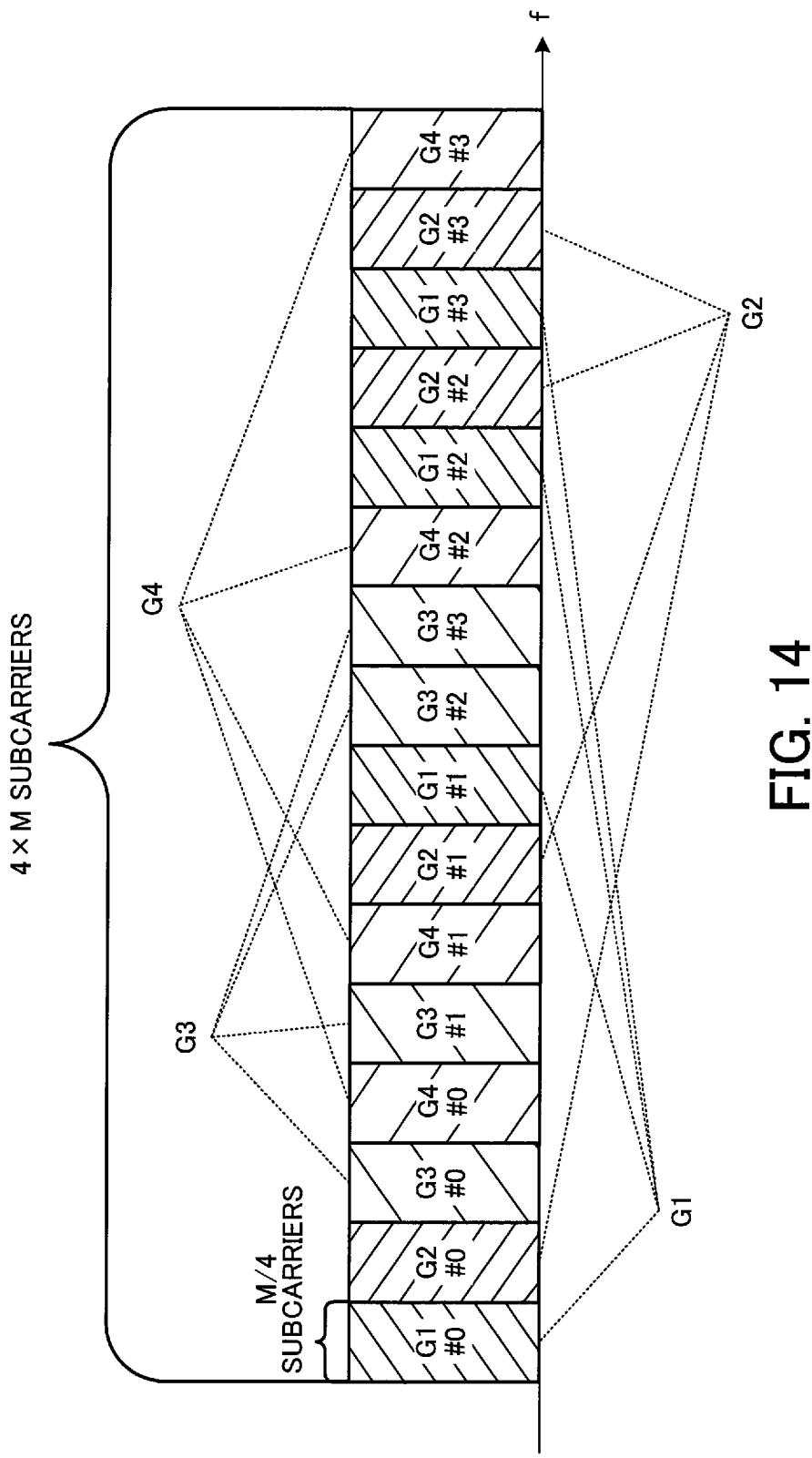
FIG. 14 illustrates a system bandwidth processed by circuit blocks.

FIG. 14 illustrates a system bandwidth processed by the circuit blocks. Let it be assumed here that each of the circuit blocks 10, 20, 30 and 40 illustrated in FIG. 13 has the capability to process M subcarriers of the system bandwidth and that the system bandwidth to be processed by the wireless base station is 4×M subcarriers.

In this case, the wireless interface illustrated in FIG. 13 divides the system bandwidth of 4×M subcarriers into groups G1 to G4, as illustrated in FIG. 14, so that the respective M subcarriers of the groups G1 to G4 of the system bandwidth may be processed by the circuit blocks 10, 20, 30 and 40, respectively.

Also, the subcarriers of the individual groups G1 to G4 are dispersed so as not to be continuous in terms of frequency. For example, the group G1 is subdivided into four subgroups G1#0 to G1#3 of M/4 subcarriers which are dispersed in terms of frequency, as illustrated in FIG. 14. Likewise, the group G4 is subdivided into four subgroups G4#0 to G4#3 of M/4 subcarriers which are dispersed in terms of frequency.

In order to process the frequency dispersed groups of the system bandwidth, each of the circuit blocks 10, 20, 30 and 40 illustrated in FIG. 13 clips to zero part of the input to the IDFT unit. Equation (7) below represents the IDFT operation performed by the IDFT unit of the circuit block 10.

[Equation 7]

$$\begin{pmatrix} f(0) \\ \vdots \\ f(4M-1) \end{pmatrix} = \begin{pmatrix} W^0 & \cdots & W^0 \\ \vdots & \ddots & \vdots \\ W^0 & \cdots & W^{(4M-1)(4M-1)} \end{pmatrix} \begin{pmatrix} F(0) \\ \vdots \\ F(M/4-1) \\ 0 \\ \vdots \\ F(7M/4) \\ \vdots \\ F(8M/4-1) \\ 0 \\ \vdots \\ F(11M/4) \\ \vdots \\ F(12M/4-1) \\ 0 \\ \vdots \\ F(13M/4) \\ \vdots \\ F(14M/4-1) \\ 0 \\ \vdots \end{pmatrix} \begin{matrix} \}G1\#0 \\ \\ \}G1\#1 \\ \\ \}G1\#2 \\ \\ \}G1\#3 \end{matrix} \quad (7)$$

For example, the subcarriers of the group G1 to be processed by the circuit block 10 are: F(0 to F(M/4-1), F(7M/4) to F(8M/4-1), F(11M/4) to F(12M4-1), and F(13M/4) to F(14M/4-1), as illustrated in FIG. 14. Accordingly, by clipping to zero the subcarriers other than these subcarriers as indicated by Equation (7), the circuit block 10 can subject the subcarriers of the frequency dispersed subgroups G1#0 to G1#3 to IDFT processing.

Likewise, the IDFT units of the circuit blocks 20, 30 and 40 can subject the subcarriers of their respective frequency dispersed subgroups to IDFT processing by clipping appropriate subcarriers to zero, as indicated by the following Equations (8) to (10):

[Equation 8]

$$\begin{pmatrix} f(0) \\ \vdots \\ f(4M-1) \end{pmatrix} = \begin{pmatrix} W^0 & \cdots & W^0 \\ \vdots & \ddots & \vdots \\ W^0 & \cdots & W^{(4M-1)(4M-1)} \end{pmatrix} \begin{pmatrix} 0 \\ \vdots \\ F(M/4) \\ \vdots \\ F(2M/4-1) \\ 0 \\ \vdots \\ F(6M/4) \\ \vdots \\ F(7M/4-1) \\ 0 \\ \vdots \\ F(12M/4) \\ \vdots \\ F(13M/4-1) \\ 0 \\ \vdots \\ F(14M/4) \\ \vdots \\ F(15M/4-1) \\ 0 \\ \vdots \end{pmatrix} \begin{matrix} \}G2\#0 \\ \\ \}G2\#1 \\ \\ \}G2\#2 \\ \\ \}G2\#4 \end{matrix} \quad (8)$$

[Equation 9]

$$\begin{pmatrix} f(0) \\ \vdots \\ f(4M-1) \end{pmatrix} = \begin{pmatrix} W^0 & \cdots & W^0 \\ \vdots & \ddots & \vdots \\ W^0 & \cdots & W^{(4M-1)(4M-1)} \end{pmatrix} \begin{pmatrix} 0 \\ \vdots \\ F(2M/4) \\ \vdots \\ F(3M/4-1) \\ 0 \\ \vdots \\ F(4M/4) \\ \vdots \\ F(5M/4-1) \\ 0 \\ \vdots \\ F(8M/4) \\ \vdots \\ F(9M/4-1) \\ F(9M/4) \\ \vdots \\ F(10M/4-1) \\ 0 \\ \vdots \end{pmatrix} \begin{matrix} \}G3\#0 \\ \\ \}G3\#1 \\ \\ \}G3\#2 \\ \}G3\#3 \end{matrix} \quad (9)$$

[Equation 10]

-continued $$\begin{pmatrix} f(0) \\ \vdots \\ f(4M-1) \end{pmatrix} = \begin{pmatrix} W^0 & \cdots & W^0 \\ \vdots & \ddots & \vdots \\ W^0 & \cdots & W^{(4M-1)(4M-1)} \end{pmatrix} \begin{pmatrix} 0 \\ \vdots \\ F(3M/4) \\ \vdots \\ F(4M/4-1) \\ 0 \\ \vdots \\ F(5M/4) \\ \vdots \\ F(6M/4-1) \\ 0 \\ \vdots \\ F(10M/4) \\ \vdots \\ F(11M/4-1) \\ 0 \\ \vdots \\ F(15M/4) \\ \vdots \\ F(16M/4-1) \\ \vdots \end{pmatrix} \begin{matrix} \\ \}G4\#0 \\ \\ \\ \}G4\#1 \\ \\ \\ \}G4\#2 \\ \\ \\ \}G4\#3 \\ \\ \end{matrix} \quad (10)$$

Thus, by grouping subcarriers dispersed in terms of frequency and having the groups processed by the respective circuit blocks 10, 20, 30 and 40, it is possible to reduce the influence of noise and the like.

A fourth embodiment will be now described in detail with reference to the drawings. In the first embodiment, the system bandwidth is divided into equal parts to be processed by the respective circuit blocks. According to the fourth embodiment, the system bandwidth is divided unequally to be processed by the respective circuit blocks.

Figure 15:
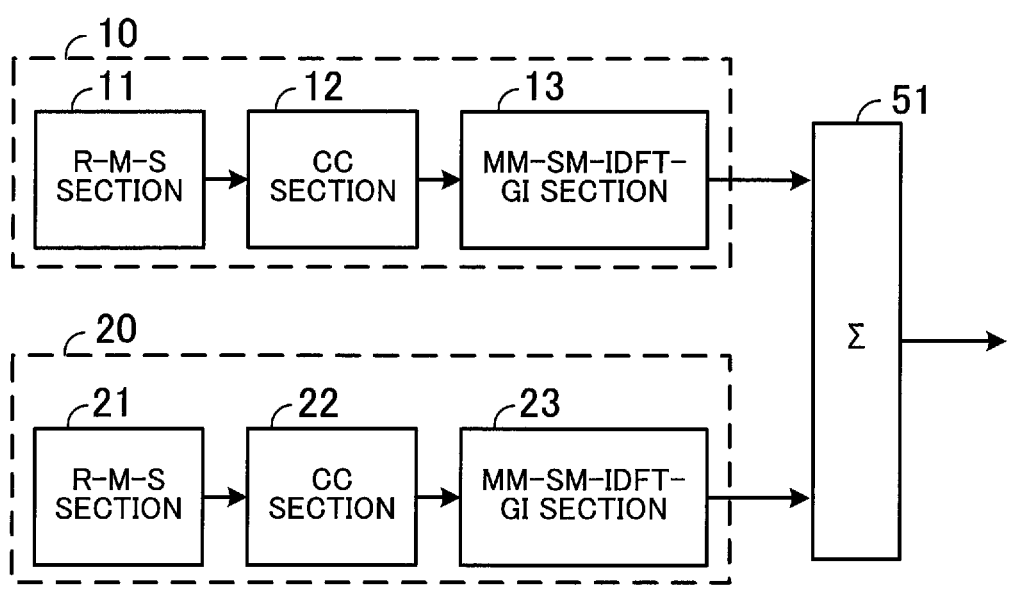
FIG. 15 is a block diagram of a wireless interface in a wireless base station according to a fourth embodiment.

FIG. 15 is a block diagram of a wireless interface in a wireless base station according to the fourth embodiment. In the wireless interface illustrated in FIG. 15, like reference numerals refer to like elements also appearing in FIG. 2, and description of such elements is omitted. It is assumed that the circuit blocks 10 and 20 illustrated in FIG. 15 each have the capability to process M subcarriers of the system bandwidth.

Figure 16:
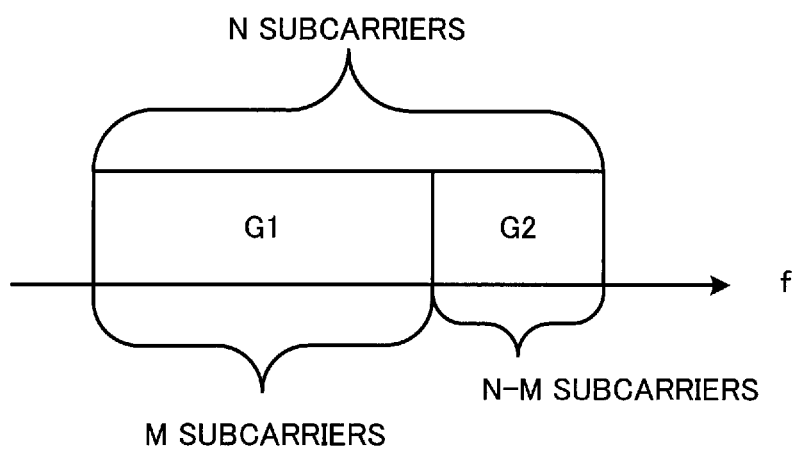
FIG. 16 illustrates a system bandwidth processed by circuit blocks.

FIG. 16 illustrates a system bandwidth processed by the circuit blocks. As illustrated in FIG. 16, the circuit blocks 10 and 20 are to process the system bandwidth of N (M<N<2M) subcarriers.

Since each of the circuit blocks 10 and 20 illustrated in FIG. 15 has the capability to process M subcarriers, the system bandwidth illustrated in FIG. 16 is divided into a group G1 of M subcarriers and a group G2 of N−M subcarriers. The circuit block 10 processes the M subcarriers of the group G1, while the circuit block 20 processes the N−M subcarriers.

The scheduling units in the R-M-S sections 11 and 21 of the circuit blocks 10 and 20 equalize the electric power within the system bandwidth. For example, the scheduling unit in the circuit block 10 equalizes the electric power so that the transmit power of the group G1 may become equal to: the transmit power per antenna×(M/N), and the scheduling unit in the circuit block 20 equalizes the electric power so that the transmit power of the group G2 may become equal to: the transmit power per antenna×{(N−M)/N}.

Thus, even though the system bandwidth is not grouped into equal parts, it is possible to process the system bandwidth without exchanging parameters between the circuit blocks 10 and 20.

A fifth embodiment will be now described in detail with reference to the drawings. In the fifth embodiment, different system bandwidths are processed flexibly by using a combination of multiple antennas.

Figure 17:
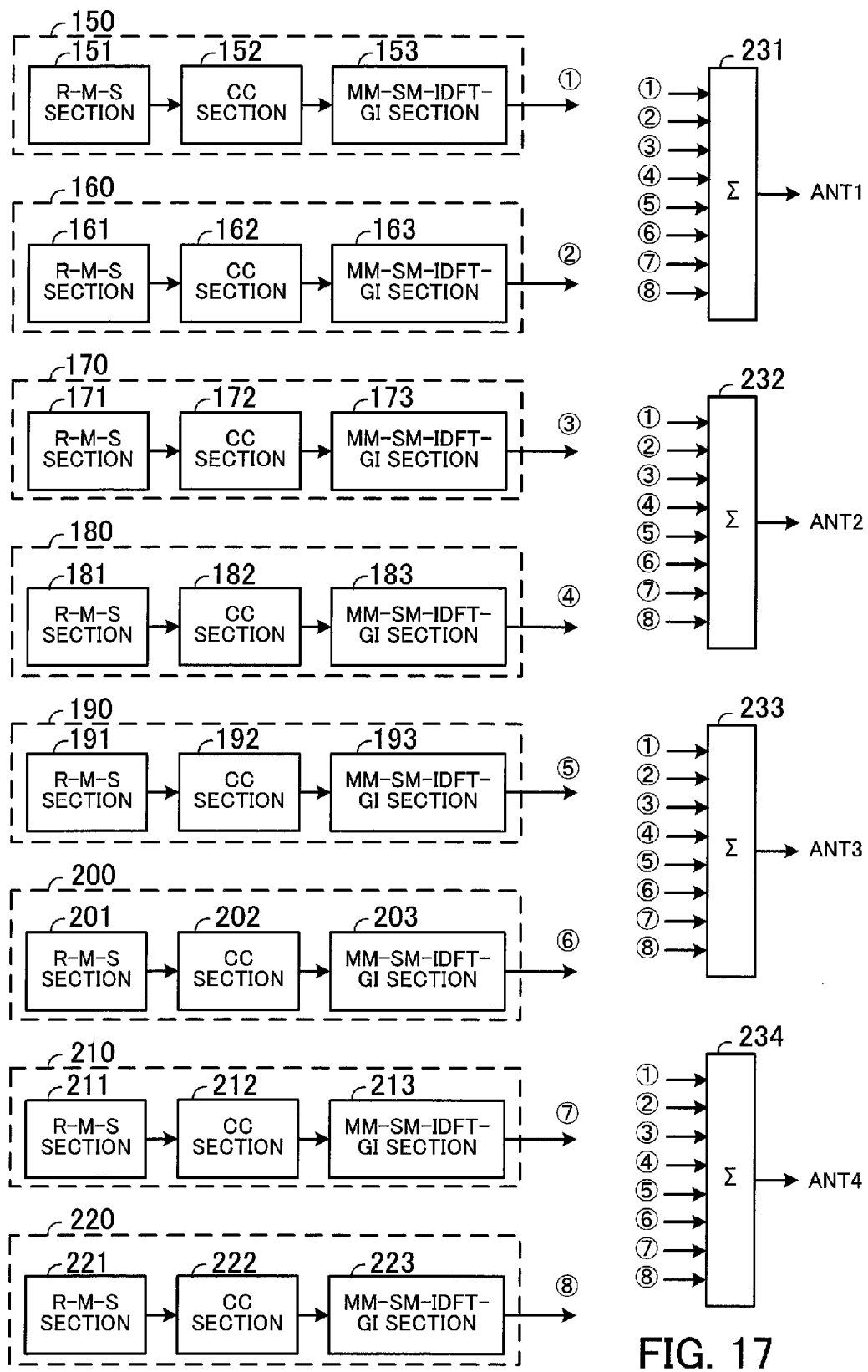
FIG. 17 is a block diagram of a wireless interface in a wireless base station according to a fifth embodiment.

FIG. 17 is a block diagram of a wireless interface in a wireless base station according to the fifth embodiment. Each of circuit blocks 150, 160, 170, 180, 190, 200, 210 and 220 illustrated in FIG. 17 has the same function as the circuit block 10 illustrated in FIG. 2, and therefore, description thereof is omitted.

The outputs of the circuit blocks 150, 160, 170, 180, 190, 200, 210 and 220, indicated by encircled numbers, are connected to the inputs of adders 231 to 234 as indicated by the corresponding encircled numbers. The outputs of the adders 231 to 234 are connected to antennas ANT1 to ANT4, respectively.

The circuit blocks 150, 160, 170, 180, 190, 200, 210 and 220 each have the capability to process M subcarriers. At the adder 231, the inputs 3 through 8 are clipped to "0", so that only the inputs 1 and 2 are added up and output. At the adder 232, the inputs 1, 2 and 5 to 8 are clipped to "0", and thus, only the inputs 3 and 4 are added together and output. At the adder 233, the inputs 1 to 4 and 8 are clipped to "0" and only the inputs 5 to 7 are added up and output. At the adder 234, the inputs 1 through 7 are clipped to "0", so that the input 8 alone is output.

Figure 18A:
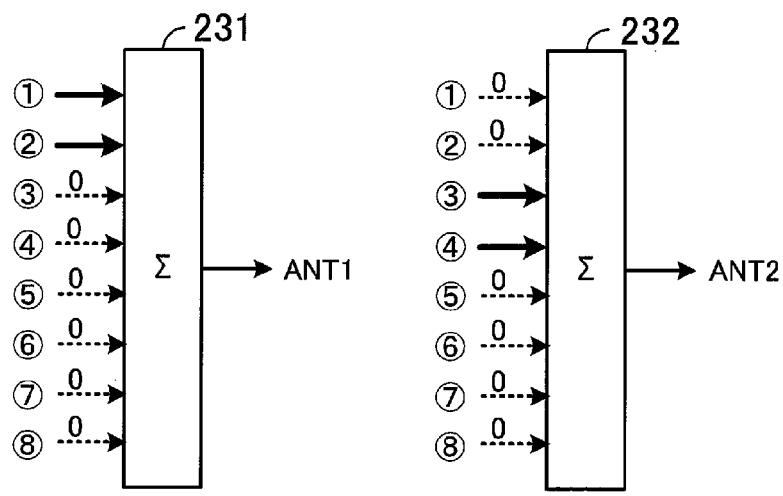
FIGS. 18A, 18B and 18C illustrate operations of adders.
Figure 18B:
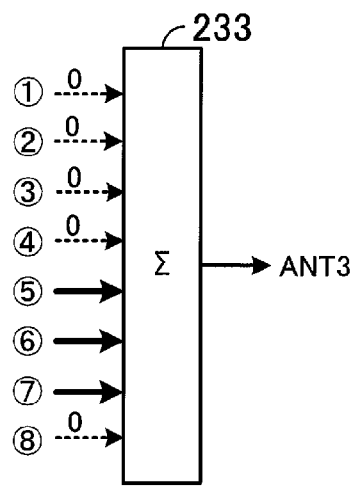
Figure 18C:
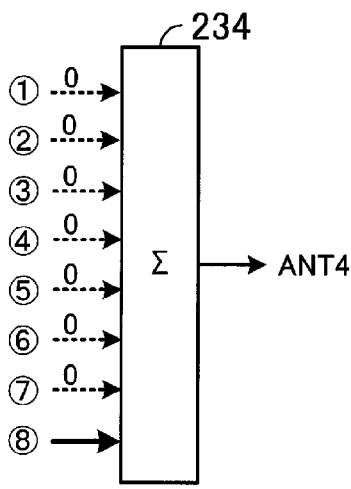

FIGS. 18A, 18B and 18C illustrate operations of the adders, wherein FIG. 18A illustrates the operations of the adders 231 and 232, FIG. 18B illustrates the operation of the adder 233, and FIG. 18C illustrates the operation of the adder 234.

As illustrated in FIG. 18A, the adder 231 adds up the outputs of the circuit blocks 150 and 160, and the adder 232 adds up the outputs of the circuit blocks 170 and 180.

Also, as illustrated in FIG. 18B, the adder 233 adds up the outputs of the circuit blocks 190, 200 and 210.

As illustrated in FIG. 18C, the adder 234 outputs the output of the circuit block 220.

Figure 19A:
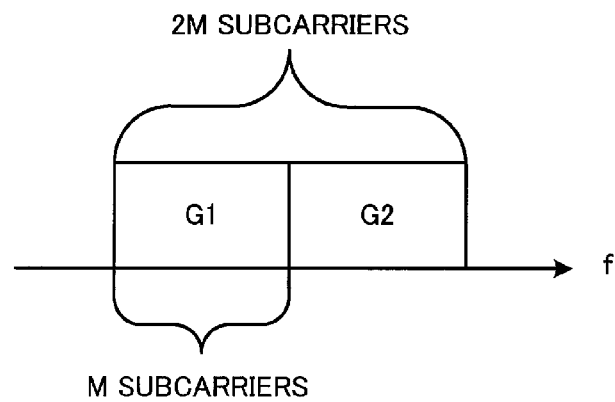
FIGS. 19A, 19B and 19C illustrate system bandwidths processed by circuit blocks.
Figure 19B:
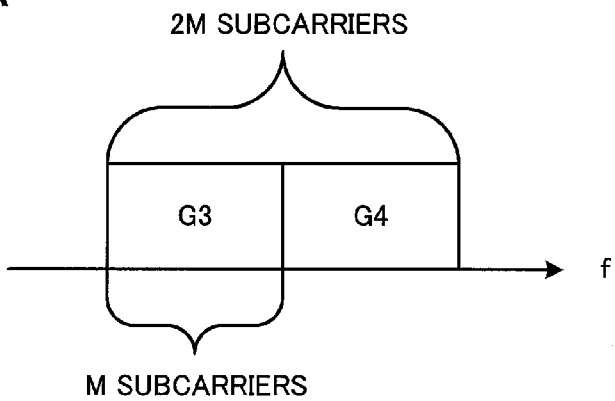
Figure 19B:
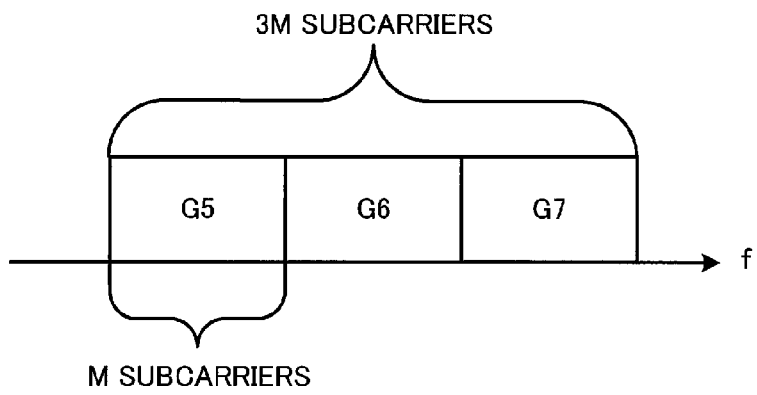
Figure 19C:
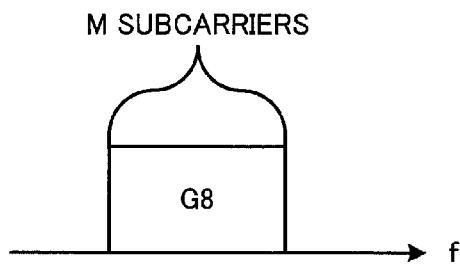

FIGS. 19A, 19B and 19C illustrate system bandwidths processed by the circuit blocks, wherein FIG. 19A illustrates system bandwidths of data transmitted respectively by the antennas ANT1 and ANT2 in FIG. 17, FIG. 19B illustrates a system bandwidth of data transmitted by the antenna ANT3 in FIG. 17, and FIG. 19C illustrates a system bandwidth of data transmitted by the antenna ANT4 in FIG. 17.

Where the system bandwidth of data illustrated in FIG. 19A is to be transmitted by the two antennas ANT1 and ANT2, the 2M subcarriers are divided into groups G1 to G4 of M subcarriers. The system bandwidth of data illustrated in the upper part of FIG. 19A indicates the subcarriers transmitted by the antenna ANT1, and the system bandwidth of data illustrated in the lower part of FIG. 19A indicates the subcarriers transmitted by the antenna ANT2.

The M subcarriers of the group G1 are processed, for example, by the circuit block 150 illustrated in FIG. 17. Likewise, the M subcarriers of the group G4 are processed by the circuit block 180 illustrated in FIG. 17.

The electric power outputs of the circuit blocks 150 and 160 are added together by the adder 231 to be transmitted from the antenna ANT1 into the air. The electric power outputs of the circuit blocks 170 and 180 are added together by the adder 232 to be output from the antenna ANT2 into the air.

Where the system bandwidth of 3M subcarriers illustrated in FIG. 19B is to be transmitted by the single antenna ANT3, the 3M subcarriers are divided into groups G5 to G7 of M subcarriers.

The M subcarriers of the group G5 are processed, for example, by the circuit block 190 illustrated in FIG. 17. Likewise, the M subcarriers of the group G7 are processed by the circuit block 210 illustrated in FIG. 17.

The electric power outputs of the circuit blocks 190, 200 and 210 are added together by the adder 233 to be output from the antenna ANT3 into the air.

Where the system bandwidth of M subcarriers illustrated in FIG. 19C is to transmitted by the single antenna ANT4, the M subcarriers are processed, for example, by the circuit block 220 illustrated in FIG. 17.

The electric power output of the circuit block 220 is subjected to addition at the adder 234, and the result is output from the antenna ANT4 into the air.

The circuit blocks 150, 160, 170, 180, 190, 200, 210 and 220 and the adders 231 to 234 are selectively activated and deactivated by a switching device so that different system bandwidths may be processed by different combinations of the circuit blocks and output from different combinations of the antennas.

For example, where the system bandwidths of data illustrated in FIG. 19A are to be processed and transmitted from the antennas ANT1 and ANT2, the switching device activates the circuit blocks 150, 160, 170 and 180 and the adders 231 and 232. Also, where the system bandwidth of data illustrated in FIG. 19B is to be processed and transmitted from the antenna ANT3, the switching device activates the circuit blocks 190, 200 and 210 and the adder 233. Where the system bandwidth of data illustrated in FIG. 19C is to be processed and transmitted form the antennas ANT1 to ANT4, the switching device activates the circuit blocks 150, 160, 170, 180, 190, 200, 210 and 220 and the adders 231 to 234.

Thus, the multiple circuit blocks 150, 160, 170, 180, 190, 200, 210 and 220 and the multiple adders 231 to 234 are provided, and the multiple antennas ANT1 to ANT4 are connected to the respective adders 231 to 234. This permits a plurality of system bandwidths to be flexibly processed for transmission from different combinations of the antennas.

A sixth embodiment will be now described in detail with reference to the drawings. In the sixth embodiment, the outputs of a plurality of circuit blocks are switched by switches so as to be output to any one of multiple antennas. This permits collective handover of each of the circuit blocks.

Figure 20:
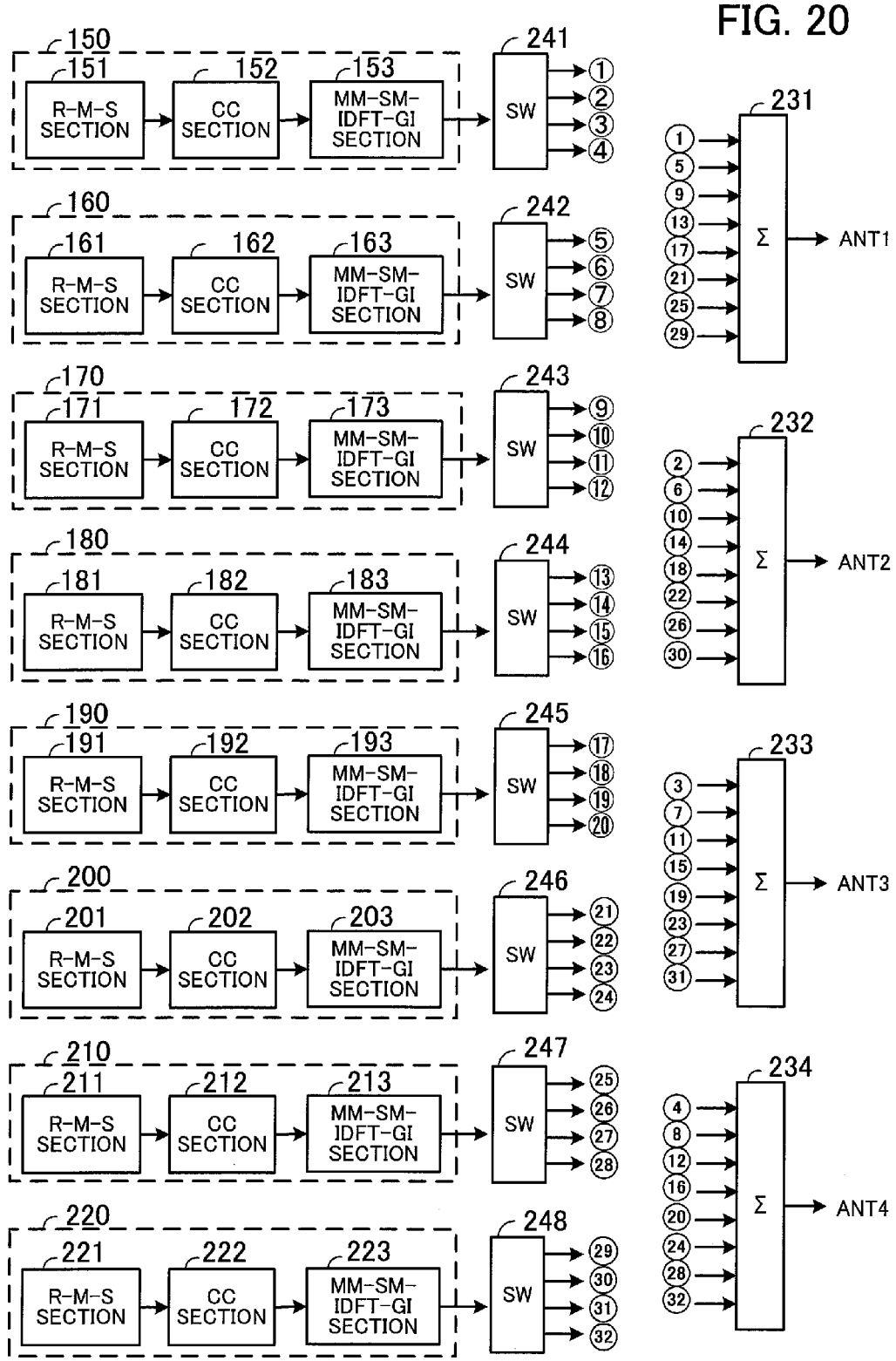
FIG. 20 is a block diagram of a wireless interface in a wireless base station according to a sixth embodiment.

FIG. 20 is a block diagram of a wireless interface in a wireless base station according to the sixth embodiment. In FIG. 20, like reference numerals are used to denote like elements also appearing in FIG. 17, and description of such elements is omitted. In the wireless interface illustrated in FIG. 20, switches (SWs) 241 to 248 are inserted between the circuit blocks 150, 160, 170, 180, 190, 200, 210 and 220 and the adders 231 to 234, as compared with the wireless interface illustrated in FIG. 17. The outputs of the SWs 241 to 248 indicated by encircled numbers in FIG. 20 are connected to the inputs of the adders 231 to 234 as indicated by the corresponding encircled numbers.

Let it be assumed that the wireless interface of FIG. 20 is capable of processing a system bandwidth of 8×M subcarriers and that each of the circuit blocks 150, 160, 170, 180, 190, 200, 210 and 220 is capable of processing M subcarriers of the system bandwidth.

Figure 21A:
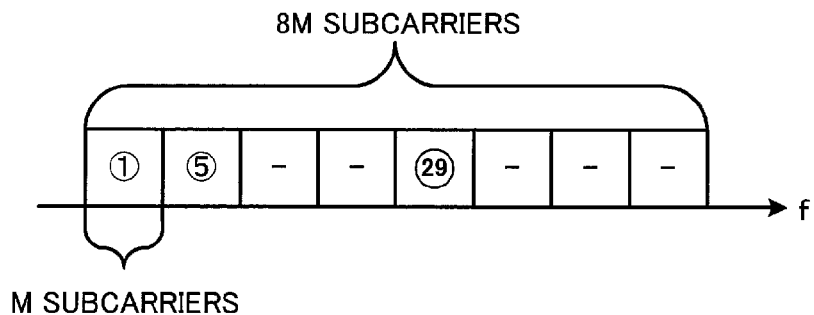
FIGS. 21A, 21B, 21C and 21D illustrate system bandwidths of respective antennas.
Figure 21B:
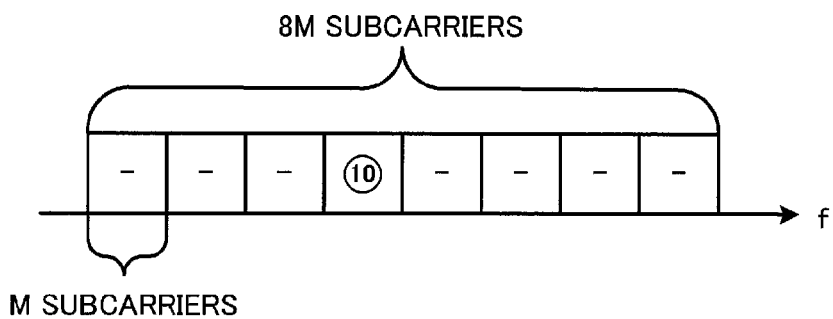
Figure 21C:
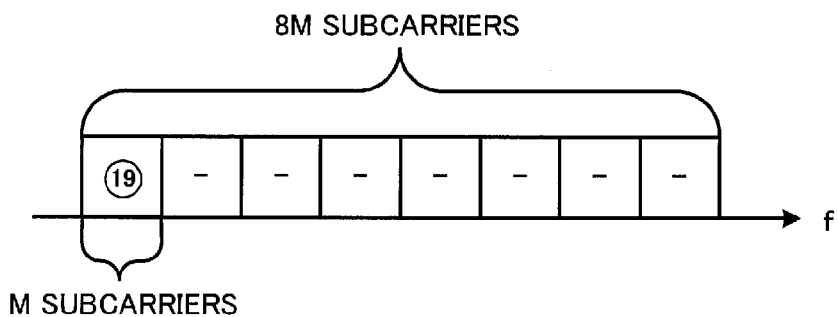
Figure 21D:
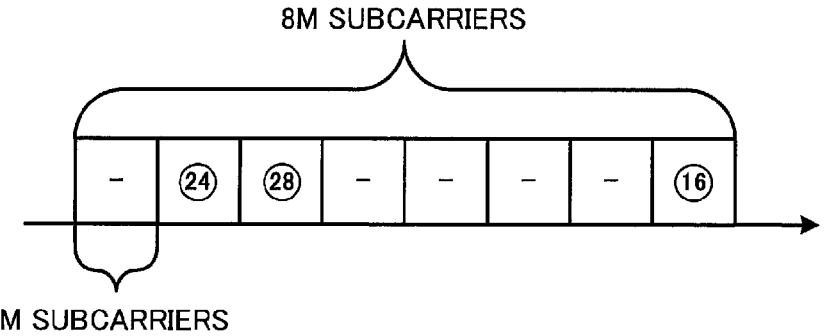

FIGS. 21A, 21B, 21C and 21D illustrate system bandwidths of respective antennas, wherein FIG. 21A illustrates the system bandwidth of the antenna ANT1, FIG. 21B illustrates the system bandwidth of the antenna ANT2, FIG. 21C illustrates the system bandwidth of the antenna ANT3, and FIG. 21D illustrates the system bandwidth of the antenna ANT4. The encircled numbers correspond to those indicating the outputs of the SWs 241 to 248 in FIG. 20.

As illustrated in FIG. 21A, the signals processed by the circuit blocks 150, 160 and 220 are output from the antenna ANT1. That is, the SWs 241, 242 and 248 control the signals so that the signals processed by the circuit blocks 150, 160 and 220 may be output to the adder 231.

Also, as illustrated in FIG. 21B, the signals processed by the circuit block 170 are output from the antenna ANT2. Namely, the SW 243 controls the signals so that the signals processed by the circuit block 170 may be output to the adder 232.

Further, as illustrated in FIG. 21C, the signals processed by the circuit block 190 are output from the antenna ANT3. That is, the SW 245 controls the signals so that the signals processed by the circuit block 190 may be output to the adder 233.

As illustrated in FIG. 21D, the signals processed by the circuit blocks 180, 200 and 210 are output from the antenna ANT4. That is, the SWs 244, 246 and 247 control the signals so that the signals processed by the circuit blocks 180, 200 and 210 may be output to the adder 234.

Figure 22A:
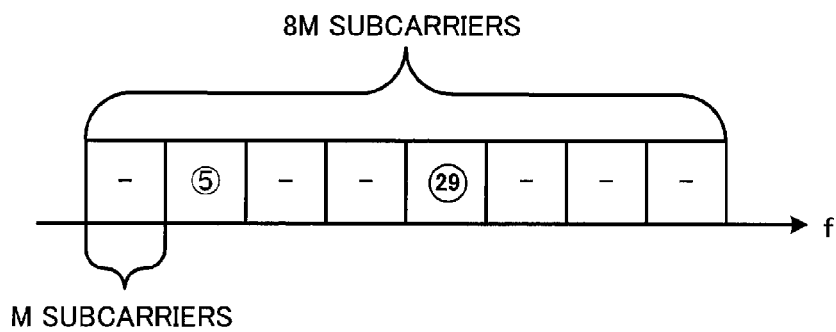
FIGS. 22A and 22B illustrate switching operation at the time of handover.
Figure 22B:
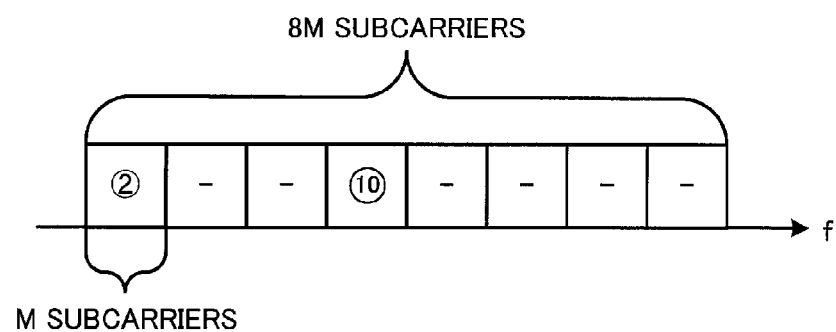

FIGS. 22A and 22B illustrate switching operation at the time of handover, wherein FIG. 22A illustrates the system bandwidth of signals output from the antenna ANT1 after a handover, and FIG. 22B illustrates the system bandwidth of signals output from the antenna ANT2 after the handover. The system bandwidth of signals output from the antenna ANT1 before the handover is illustrated in FIG. 21A, and the system bandwidth of signals output from the antenna ANT2 before the handover is illustrated in FIG. 21B.

When handing over the destination of the output of the circuit block 150 from the antenna ANT1 to the antenna ANT2, the SW 241 controls the output of the circuit block 150 so as to be supplied to the adder 232. Consequently, after the handover, the antenna ANT1 outputs a system bandwidth of signals illustrated in FIG. 22A, and the antenna ANT2 outputs a system bandwidth of signals illustrated in FIG. 22B.

In this manner, the outputs of the multiple circuit blocks 150, 160, 170, 180, 190, 200, 210 and 220 are switched by the SWs 241 to 248 so that the individual outputs may be supplied to any one of the multiple antennas ANT1 to ANT4. This permits collective handover of each of the circuit blocks 150, 160, 170, 180, 190, 200, 210 and 220.

A seventh embodiment will be now described in detail with reference to the drawings. In the first embodiment, users are fixedly allocated to multiple circuit blocks. According to the seventh embodiment, users are distributed among the circuit blocks.

Figure 23:
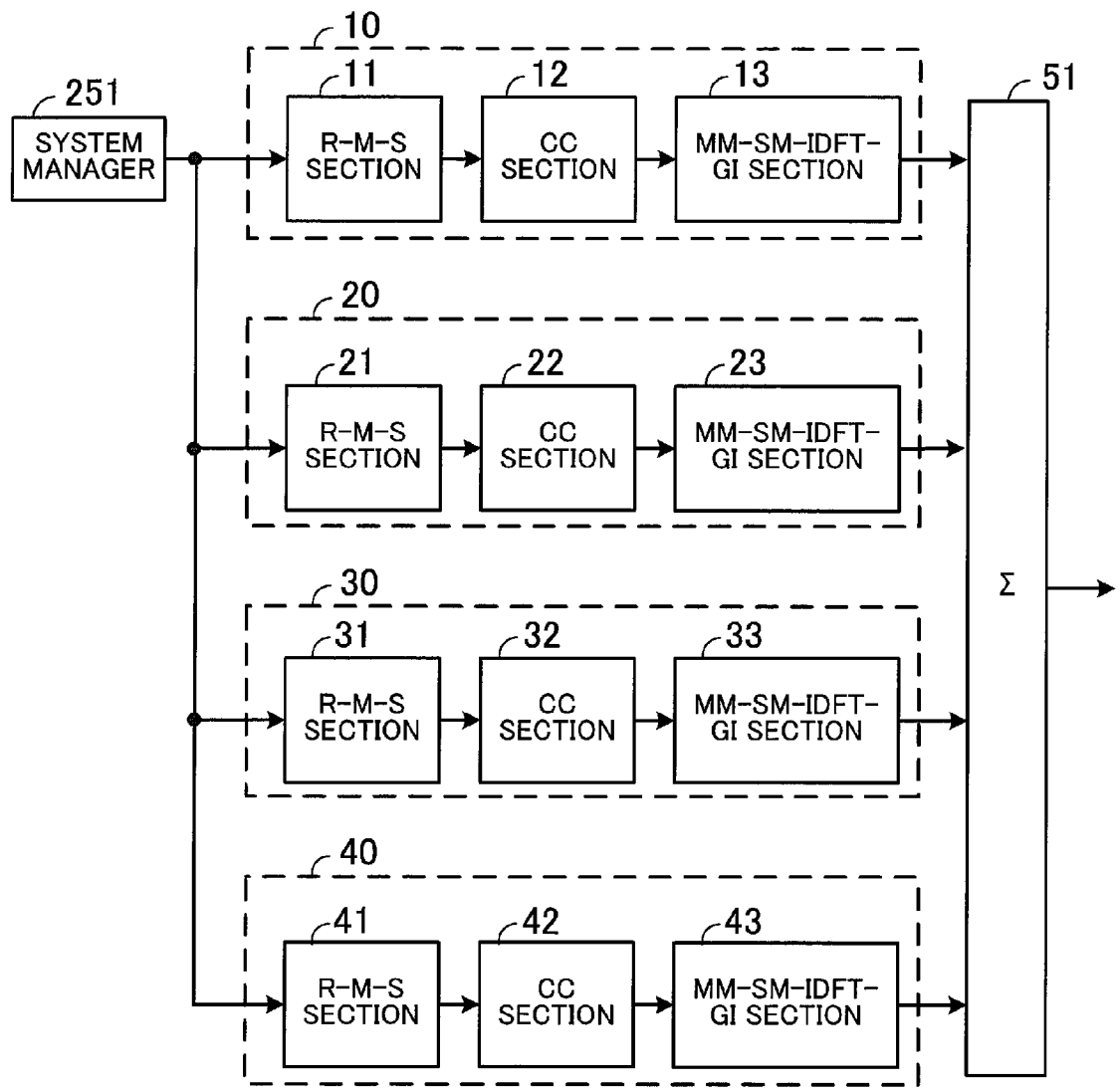
FIG. 23 is a block diagram of a wireless interface in a wireless base station according to a seventh embodiment.

FIG. 23 is a block diagram of a wireless interface in a wireless base station according to the seventh embodiment. In FIG. 23, like reference numerals refer to like elements also appearing in FIG. 2, and description of such elements is omitted.

Compared with the counterpart illustrated in FIG. 2, the wireless interface of FIG. 23 is provided with a system manager 251. The system manager 251 allocates users to the circuit blocks 10, 20, 30 and 40 in accordance with priority such as QoS (Quality Of Service). Where each of the circuit blocks 10, 20, 30 and 40 is capable of handling 32 users, the four circuit blocks 10, 20, 30 and 40 altogether can handle a maximum of 128 users.

Figure 24:
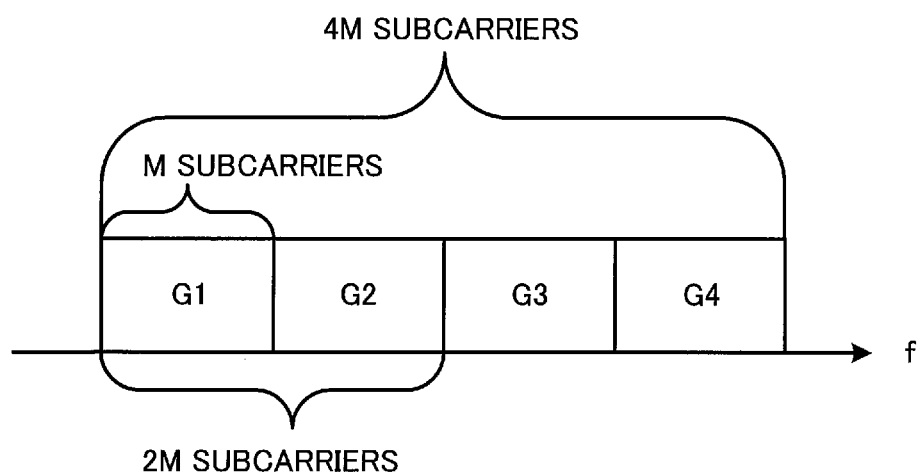
FIG. 24 illustrates a system bandwidth processed by circuit blocks.

FIG. 24 illustrates a system bandwidth processed by the circuit blocks. Let it be assumed here that each of the circuit blocks 10, 20, 30 and 40 illustrated in FIG. 23 has the capability to process M subcarriers and that the circuit blocks 10, 20, 30 and 40 altogether process the system bandwidth of 4×M carriers illustrated in FIG. 24.

In this case, the 4×M subcarriers are divided equally into groups G1 to G4, and the divided subcarriers of the groups G1 to G4 are processed by the respective circuit blocks 10, 20, 30 and 40.

Let us suppose that 16 users, for example, are handled by means of the system bandwidth illustrated in FIG. 24. In this case, the system manager 251 illustrated in FIG. 23 does not allocate all users to a specific one of the circuit blocks 10, 20, 30 and 40, but allocates four users to each of the circuit blocks 10, 20, 30 and 40, for example. Thus, by allocating the users evenly to the circuit blocks 10, 20, 30 and 40, it is possible to avoid a situation where one or more of the circuit blocks 10, 20, 30 and 40 remain unused.

FIG. 25 illustrates the allocation of the users to the respective circuit blocks. The circuit blocks 10, 20, 30 and 40 are allocated users A to D, users E to H, users I to L, and users M to P, respectively, by the system manager 251. The scheduling units in the respective circuit blocks 10, 20, 30 and 40 schedule the users for times t1 to t3 within the range allocated by the system manager 251.

For example, the scheduling unit in the circuit block 10 allocates the subcarriers of the group G1 to the users A and D at time t1, and allocates the subcarriers of the group G1 to the users C and B at time t2.

Figure 26:
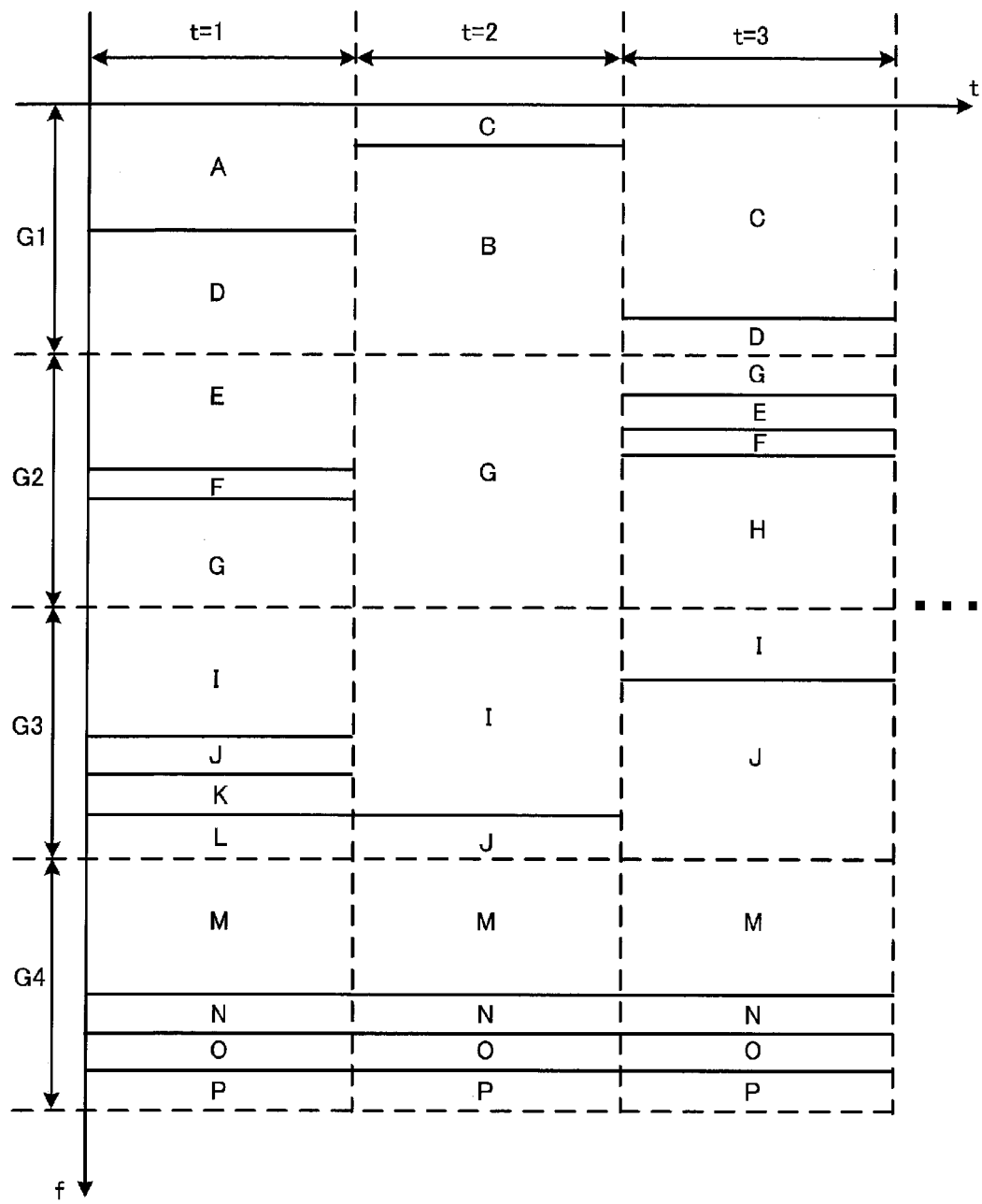
FIG. 26 illustrates scheduling for the users along the time and frequency axes, the users being allocated in the manner illustrated in FIG. 25.

FIG. 26 illustrates the scheduling for the users exemplified in FIG. 25 along the time and frequency axes. The users A to D, the users E to H, the users I to L and the users M to P allocated respectively to the circuit blocks 10, 20, 30 and 40 are selected for times t1 to t3 by the circuit blocks 10, 20, 30 and 40 in the manner indicated in FIG. 26, for example. In FIG. 5, the horizontal axis indicates time and the vertical axis indicates frequency.

For example, at time t1, the subcarriers of the group G1 are allocated to the users A and D by the circuit block 10, and the subcarriers of the group G2 are allocated to the users E, F and G by the circuit block 20. The subcarriers of the group G3 are allocated to the users I, J, K and L by the circuit block 30, and the subcarriers of the group G4 are allocated to the users M, N, O and P by the circuit block 40.

In this manner, the users are allocated to the circuit blocks 10, 20, 30 and 40 by the system manager 251. This prevents the circuit blocks 10, 20, 30 and 40 from being kept in an idle state, making it possible to improve the bandwidth efficiency and traffic.

An eighth embodiment will be now described in detail with reference to the drawings. In the eighth embodiment, a function or functions of the circuit blocks are unified, to thereby reduce the circuit size.

Figure 27:
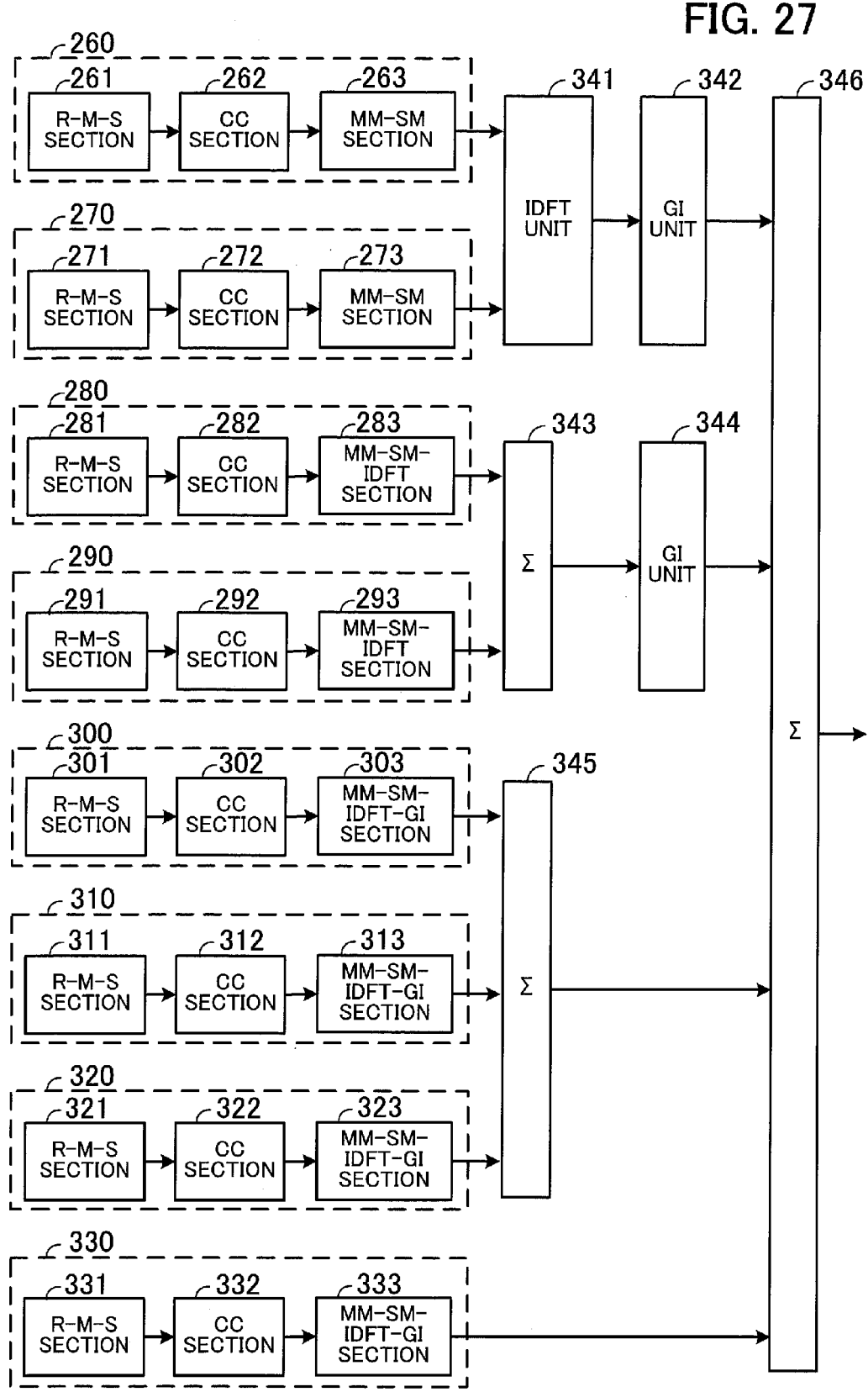
FIG. 27 is a block diagram of a wireless interface in a wireless base station according to an eighth embodiment.

FIG. 27 is a block diagram of a wireless interface in a wireless base station according to the eighth embodiment. As illustrated in FIG. 27, the wireless interface includes circuit blocks 260, 270, 280, 290, 300, 310, 320 and 330.

The circuit block 260 illustrated in FIG. 27 and the circuit block 10 illustrated in FIG. 2 differ from each other in that the latter is provided with the MM-SM-IDFT-GI section 13. Specifically, the circuit block 260 has an MM-SM section from which the IDFT unit and the GI unit are excluded. This applies to the circuit block 270 as well.

The circuit block 280 illustrated in FIG. 27 and the circuit block 10 illustrated in FIG. 2 differ from each other in that the latter is provided with the MM-SM-IDFT-GI section 13. Specifically, the circuit block 280 has an MM-SM-IDFT section from which the GI unit is excluded. This applies to the circuit block 290 as well.

The circuit blocks 300, 310, 320 and 330 in FIG. 27 are identical with the circuit block 10 illustrated in FIG. 2, and therefore, description thereof is omitted.

An IDFT unit 341 and a GI unit 342 are connected to the outputs of the circuit blocks 260 and 270. That is, the circuit blocks 260 and 270 share the IDFT and GI units. The IDFT unit 341 and the GI unit 342 have the same functions as the IDFT and GI units, respectively, explained above with reference to FIG. 2.

Where the IDFT unit is shared as is the case with the circuit blocks 260 and 270, it is unnecessary to connect an adder to the output side, because the IDFT unit 341 performs the IDFT processing on the subcarriers which have been subjected to the carrier mapping by the MM-SM units 263 and 273.

An adder 343 and a GI unit 344 are connected to the outputs of the circuit blocks 280 and 290. That is to say, the circuit blocks 280 and 290 share the GI unit.

The circuit blocks 300, 310 and 320 and an adder 345 are identical with their respective counterparts of the wireless interface illustrated in FIG. 2, and therefore, description of these elements is omitted.

An adder 346 adds up the electric power levels of the transmit signals output from the GI units 342 and 344, the adder 345, and the circuit block 330.

Thus, by sharing the IDFT unit 341 and the GI unit 342, it is possible to reduce the circuit size. Since the GI unit 344 is also shared, moreover, the circuit size can be further reduced.

Furthermore, it is unnecessary to exchange parameters between the circuit blocks 300, 310, 320 and 330, whereby the load on the bus can be reduced.

A ninth embodiment will be now described in detail with reference to the drawings. The ninth embodiment is a combination of the first through eighth embodiments.

Figure 28:
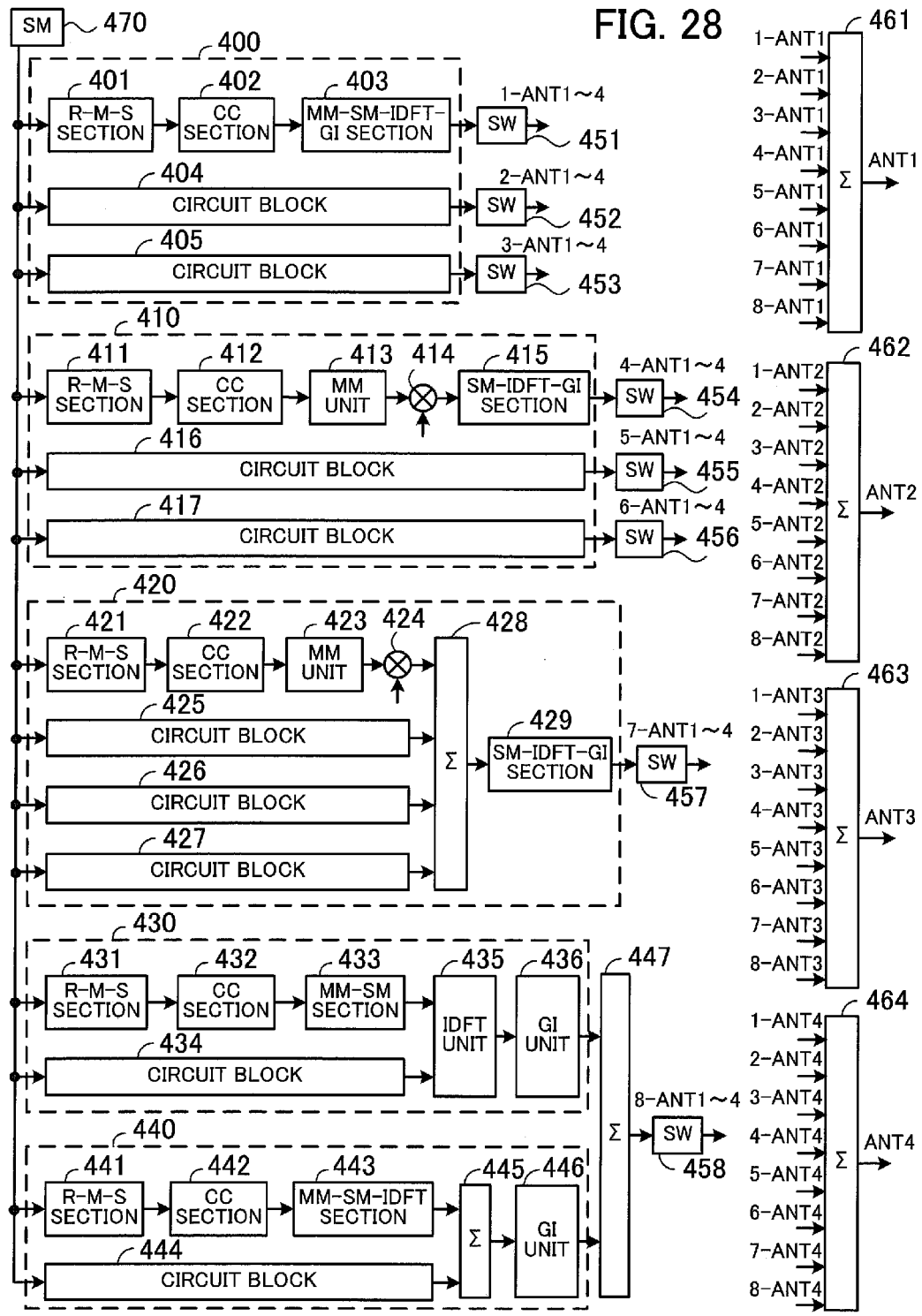
FIG. 28 is a block diagram of a wireless interface in a wireless base station according to a ninth embodiment.
Figure 29:
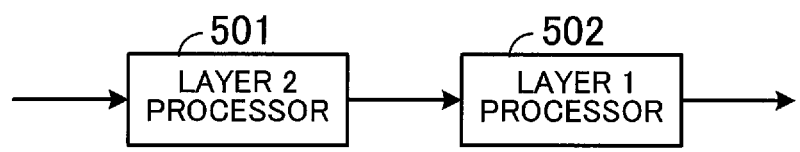
FIG. 29 is a block diagram of a wireless interface in a wireless base station.
Figure 30:
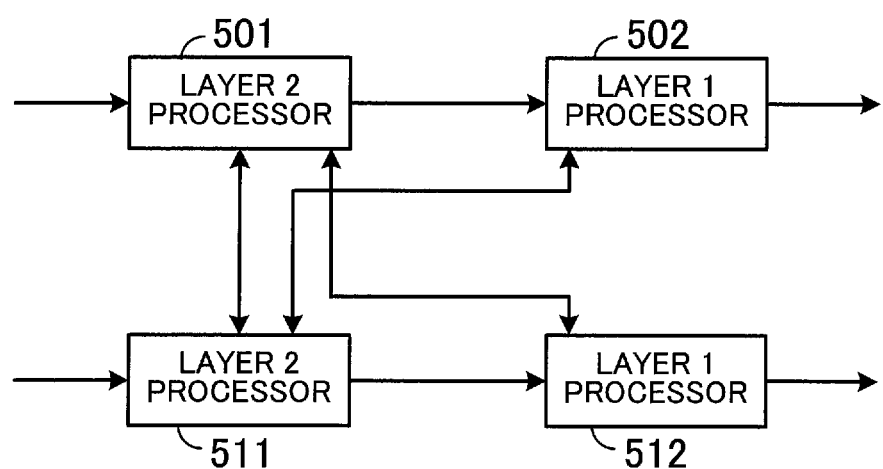
FIG. 30 illustrates the manner of how parameters are exchanged between layer processors.

FIG. 28 is a block diagram of a wireless interface in a wireless base station according to the ninth embodiment. In FIG. 28, the signs indicating the outputs of respective SWs 451 to 458 denote that the outputs of these SWs are connected to the inputs of adders 461 to 464 as indicated by the corresponding signs.

In FIG. 28, a dashed line block 400 includes an R-M-S section 401, a CC section 402 and an MM-SM-IDFT-GI section 403. Circuit blocks 404 and 405 each have functions identical with those of the R-M-S section 401, the CC section 402 and the MM-SM-IDFT-GI section 403.

The circuitry inside the dashed line block 400 groups the subcarriers such that the subcarriers of each group are dispersed as needed in terms of frequency as explained above with reference to FIG. 14, or controls the transmit power in accordance with the number of subcarriers as explained above with reference to FIG. 16.

A dashed line block 410 includes an R-M-S section 411, a CC section 412, an MM unit 413, a multiplier 414, and an SM-IDFT-GI section 415. Each of circuit blocks 416 and 417 has functions identical with those of the R-M-S section 411, the CC section 412, the MM unit 413, the multiplier 414 and the SM-IDFT-GI section 415.

The circuitry inside the dashed line block 410 subjects identical subcarriers to code multiplexing as explained above with reference to FIG. 9. Thus, by preparing a desired number of codes for identical frequencies to be multiplexed, it is possible to enhance the frequency usage efficiency.

Circuitry inside a dashed line block 420 includes an R-M-S section 421, a CC section 422, an MM unit 423, a multiplier 424, an adder 428, and an SM-IDFT-GI section 429. Each of circuit blocks 425 to 427 has functions identical with those of the R-M-S section 421, the CC section 422, the MM unit 423, and the multiplier 424.

The circuitry inside the dashed line block 420 performs code multiplexing and then addition, as explained above with reference to FIG. 12. The SM-IDFT-GI section 429 can therefore be shared.

Circuitry inside a dashed line block 430 includes an R-M-S section 431, a CC section 432, an MM-SM section 433, an IDFT unit 435, and a GI unit 436. A circuit block 434 has functions identical to those of the R-M-S section 431, the CC section 432, and the MM-SM section 433.

In the circuitry inside the dashed line block 430, the IDFT unit 435 and the GI unit 436 are shared as explained above with reference to FIG. 27, whereby the circuit size can be reduced.

Circuitry inside a dashed line block 440 includes an R-M-S section 441, a CC section 442, an MM-SM-IDFT section 443, an adder 445, and a GI unit 446. A circuit block 444 has functions identical to those of the R-M-S section 441, the CC section 442, and the MM-SM-IDFT section 443.

In the circuitry inside the dashed line block 440, the GI unit 446 is shared as explained above with reference to FIG. 27, so that the circuit size can be reduced.

The SWs 451 to 458 switch the signals output from inside the respective dashed line blocks so as to be distributed to individual antennas ANT1 to ANT4, as explained above with reference to FIG. 20, thereby making it possible to carry out collective handover of each of the circuit blocks.

In this manner, the first through eighth embodiments can be used in combination.

With the wireless base station and signal processing method disclosed herein, the system bandwidth can be widened while at the same time restraining lowering in signal processing capability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A wireless base station which communicates wirelessly with wireless terminals, comprising:
    a plurality of signal processing circuits configured to process signals at data link and physical layers; and
    a plurality of transmission units configured to wirelessly transmit the signals processed by respective ones of the signal processing circuits,
    wherein the plurality of signal processing circuits are associated with respective subcarrier groups into which subcarriers are grouped, to process the signals at the data link and physical layers,
    wherein a number of the plurality of signal processing circuits configured to process the signals is varied in accordance with a number of users managed by the wireless base station and a communication rate, and
    wherein the plurality of signal processing circuits have respective transmit powers thereof proportioned in accordance with numbers of subcarriers included in the respective subcarrier groups.

2. The wireless base station according to claim 1, wherein each of the plurality of signal processing circuits performs code multiplexing on transmit signals.

3. The wireless base station according to claim 1, wherein each of the subcarrier groups includes subcarriers dispersed in terms of frequency.

4. The wireless base station according to claim 1, wherein the plurality of signal processing circuits output transmit signals respectively processed thereby to a plurality of antennas.

5. The wireless base station according to claim 1, further comprising a switching device configured to cause transmit signals processed by the plurality of signal processing circuits to be selectively output to a plurality of antennas.

6. The wireless base station according to claim 1, further comprising an allocator configured to allocate the wireless terminals so as to be distributed among the plurality of signal processing circuits.

7. The wireless base station according to claim 1, wherein the plurality of signal processing circuits share a transformation unit configured to perform an inverse Fourier transform operation and a guard interval unit configured to perform guard interval processing.

8. The wireless base station according to claim 1, wherein the plurality of signal processing circuits share a guard interval unit configured to perform guard interval processing.

9. A signal processing method for a wireless base station which communicates wirelessly with wireless terminals, comprising:
    providing the wireless base station with a plurality of signal processing circuits configured to process signals at data link and physical layers; and
    associating the plurality of signal processing circuits with respective subcarrier groups into which subcarriers are grouped, to process the signals at the data link and physical layers,
    wherein a number of the plurality of signal processing circuits configured to process the signals is varied in accordance with a number of users managed by the wireless base station and a communication rate, and
    wherein the plurality of signal processing circuits have respective transmit powers thereof proportioned in accordance with numbers of subcarriers included in the respective subcarrier group.

10. The signal processing method according to claim 9, wherein each of the plurality of signal processing circuits performs code multiplexing on transmit signals.

11. The signal processing method according to claim 9, wherein each of the subcarrier groups includes subcarriers dispersed in terms of frequency.

12. The signal processing method according to claim 9, wherein the plurality of signal processing circuits output transmit signals respectively processed thereby to a plurality of antennas.

* * * * *